(12) United States Patent
Yamaguchi et al.

(10) Patent No.: US 8,243,387 B2
(45) Date of Patent: Aug. 14, 2012

(54) MAGNETIC HEAD WITH PLATED MAGNETIC FILM FORMED ON PDNI ALLOY ELECTRODE FILM

(75) Inventors: Atsushi Yamaguchi, Tokyo (JP); Kiyoshi Noguchi, Tokyo (JP); Shingo Miyata, Tokyo (JP); Masashi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 1178 days.

(21) Appl. No.: 11/733,469

(22) Filed: Apr. 10, 2007

(65) Prior Publication Data

US 2008/0253027 A1    Oct. 16, 2008

(51) Int. Cl.
 *G11B 5/31* (2006.01)
(52) U.S. Cl. .......... 360/125.12; 360/119.04; 360/125.13
(58) Field of Classification Search ................. None
 See application file for complete search history.

(56) References Cited

U.S. PATENT DOCUMENTS

| | | | |
|---|---|---|---|
| 2002/0080523 A1* | 6/2002 | Sato et al. ............... | 360/125.13 |
| 2002/0145824 A1* | 10/2002 | Tabakovic et al. ......... | 360/126 |
| 2004/0032692 A1* | 2/2004 | Kobayashi ............... | 360/125.13 |
| 2004/0101712 A1* | 5/2004 | Kudo et al. ............. | 428/692 |
| 2005/0083607 A1* | 4/2005 | Sasaki et al. ............ | 360/125.45 |
| 2005/0128637 A1* | 6/2005 | Johnston et al. .......... | 360/125 |
| 2007/0195457 A1 | 8/2007 | Matono et al. | |
| 2007/0211391 A1 | 9/2007 | Hirata et al. | |
| 2007/0285835 A1* | 12/2007 | Sun et al. ............... | 360/126 |
| 2008/0253024 A1 | 10/2008 | Miyata et al. | |
| 2008/0316642 A1 | 12/2008 | Yamaguchi et al. | |

FOREIGN PATENT DOCUMENTS

| | | |
|---|---|---|
| JP | 2001-76317 | 3/2001 |
| JP | 2002-157704 | 5/2002 |
| JP | 2002-230716 | 8/2002 |
| JP | 2002-352402 | 12/2002 |
| JP | 2006-253252 | 9/2006 |
| JP | 2006-269690 | 10/2006 |
| JP | 2007-242786 | 9/2007 |
| JP | 2007-257815 | 10/2007 |

* cited by examiner

*Primary Examiner* — Craig A. Renner
(74) *Attorney, Agent, or Firm* — Oblon, Spivak, McClelland, Maier & Neustadt, L.L.P.

(57) ABSTRACT

The present invention relates to a perpendicular recording magnetic head. A perpendicular recording element includes a main magnetic pole film for emitting a perpendicular magnetic field and is supported by a slider. The main magnetic pole film includes an electrode film and a plated film, the electrode film is an alloy film of at least one element selected from the platinum group and Ni, and the plated film is a magnetic film grown on the electrode film.

26 Claims, 15 Drawing Sheets

P1; Fe80Co20
P2; Fe70Co25Ni5
P3; Fe50Co45Ni5
P4; Fe40Co60

MAGNETIC HEAD WITH PLATED MAGNETIC FILM FORMED ON PDNI ALLOY ELECTRODE FILM

TECHNICAL FIELD

The present invention relates to a magnetic head, a head assembly, and a magnetic recording/reproducing apparatus.

BACKGROUND OF THE INVENTION

In the field of magnetic heads to be mounted on a magnetic recording apparatus such as a hard disk drive (HDD), recently, the recording method is being shifted from longitudinal recording to perpendicular recording in order to improve the recording density with respect to a magnetic recording medium such as a hard disk. The perpendicular recording method achieves high linear recording density and also has an advantage that the recording medium after recording becomes highly resistant to heat fluctuation.

A perpendicular recording magnetic head is provided with a coil film for generating a magnetic flux and a magnetic pole film for guiding the magnetic flux to a recording medium. The magnetic pole film is constituted by a plated film formed by electroplating on an electrode film intended to function as a seed film.

In the meantime, improvement in recording capacity of a hard disk drive (HDD) requires not only to increase the track density by reducing the magnetic pole film width at the magnetic head but also to improve the recording resolution by increasing the coercive force of the medium.

In order to assure sufficient overwrite characteristic (OW) with respect to a medium of such a high coercive force, the magnetic head must have a main magnetic pole film with a high saturation magnetic flux density. In the prior art, accordingly, a plated film forming a main portion of the main magnetic pole film is made of a high saturation magnetic flux density material, such as a FeCo material, a CoNiFe ternary alloy film, and a high saturation magnetic flux density material such as Fe, and FeN, and the electrode film intended to function as a seed film is also made of a high saturation magnetic flux density material. For example, Japanese Unexamined Patent Application Publication No. 2006-253252 discloses a main magnetic pole in which a FeCoNi plated film is formed on a FeCoNi electrode film. It describes that the saturation magnetic flux density (Bs) of the main magnetic pole reaches 2.4 T.

On the other hand, Japanese Unexamined Patent Application Publication No. 2006-269690 discloses a main magnetic pole film in which a FeCo alloy plated film is formed on a non-magnetic conductive layer and then used as an electrode film for formation of a FeNi alloy plated film thereon. In this case, the saturation magnetic flux density of the FeCo alloy electrode film (plated film) is approximately 2.4 T (tesla), while the saturation magnetic flux density of the FeNi alloy plated film is approximately 2.0 T (tesla). Replacing the FeCo alloy plated film with a FeCoNi alloy plated film is also expected, and in this case, the saturation magnetic flux density is approximately 2.3 T (tesla).

In the perpendicular recording magnetic head, however, merely increasing the saturation magnetic flux density is not sufficient, and it is also necessary to avoid the "pole erase" phenomenon in which a signal recorded on a magnetic recording medium by the main magnetic pole film becomes erased when recording is not performed.

In the perpendicular recording magnetic head, the main magnetic pole film for recording has its hard axis directed along an air bearing surface to perform recording in magnetization rotation mode. That is, residual magnetization along the air bearing surface is minimized to prevent an excess magnetic flux from being emitted when recording is not performed, thereby avoiding the pole erase. In order to assure this function, the coercive force Hc of the main magnetic pole film has to be kept low.

In the prior art, however, higher saturation magnetic flux density is aimed not only for the plated film as a main portion of the main magnetic pole film but also for the electrode film as a seed film therefor, and therefore the electrode film is generally made of a magnetic material, as disclosed in Japanese Unexamined Patent Application Publication Nos. 2006-253252 and 2006-269690. A magnetic film having an increased saturation magnetic flux density also has an increased coercive force. Thus, the problem of pole erase has not been dealt with satisfactorily.

Although some prior art documents are conscious of the problem of pole erase, they are consistent in that the electrode film is made of a magnetic material and deal with it by decreasing the saturation magnetic flux density of the plated film, which inevitably sacrifices the overwrite characteristic.

Discussing respective magnetic pole films made of, for example, FeCo, FeCoNi and NiFe alloys from the viewpoint of the coercive force Hc, at first, the pole erase characteristic obviously deteriorates in a magnetic pole film in which a FeCoNi alloy plated film with a saturation magnetic flux density of 2.3 T is formed on a FeCo alloy electrode film with a saturation magnetic flux density of 2.4 T, while sufficient overwrite characteristic can be obtained. This is because Hc of the electrode film of 2.4 T is larger than Hc of the electrode film of 2.3 T.

In a magnetic head in which a magnetic pole film that is a FeNi alloy plated film with a saturation magnetic flux density of 2.0 T is formed on a FeCo alloy electrode film with a saturation magnetic flux density of 2.4 T, the pole erase characteristic can be assured, but the overwrite characteristic is insufficient to obtain a much higher recording density.

In a magnetic head in which the electrode film and the plated film are made of a FeCo alloy with a saturation magnetic flux density of 2.4 T, the overwrite characteristic can be improved, but the pole erase characteristic decreases because the FeCo alloy is a material from which excellent soft magnetic properties are inherently difficult to obtain.

In a magnetic head in which the electrode film and the plated film are formed by a FeNi alloy plated film with a saturation magnetic flux density of 2.0 T, the pole erase characteristic can be improved because the coercive force is low, but the overwrite characteristic deteriorates.

In a magnetic head in which the electrode film and the plated film are formed by a FeCoNi alloy plated film with a saturation magnetic flux density of 2.3 T, improvement in overwrite characteristic can be expected, but the characteristic margin decreases as compared with a FeNi alloy plated film with a saturation magnetic flux density of 2.0 T from the viewpoint of the pole erase characteristic.

Furthermore, since the film peeling of the electrode film has to be avoided to achieve a stable head production process, a film structure which increases the adhesion strength of the electrode film has to be obtained in addition to reducing the coercive force as described above.

SUMMARY OF THE INVENTION

It is an object of the present invention to provide a perpendicular recording magnetic head which avoids increase in coercive force due to an electrode film which is intended to function as a seed film for a plated film forming a main portion of a main magnetic pole film and also eases the problem of pole erase.

It is another object of the present invention to provide a perpendicular recording magnetic head with a film structure which is effective in preventing film peeling and capable of contributing to achieve a stable head production process.

It is still another object of the present invention to provide a perpendicular recording magnetic head with a main magnetic pole film which can assure a high saturation magnetic flux density.

It is yet another object of the present invention to provide a head assembly and a magnetic recording/reproducing apparatus using the above perpendicular recording magnetic head.

To achieve the above objects, in a main magnetic pole film of a perpendicular recording element of a magnetic head according to the present invention, an electrode film, which is a seed film for plating, is formed by an alloy film of at least one element selected from the platinum group and nickel (Ni).

In the magnetic head according to the present invention, the electrode film is excluded from the elements which determine the saturation magnetic flux density and coercive force of the main magnetic pole film, and the saturation magnetic flux density and coercive force of the main magnetic pole film are predominantly determined by magnetic properties of the plated film formed on the electrode film. Accordingly, the saturation magnetic flux density can be set to a required value and the coercive force can be decreased to a desired value by appropriately selecting the material and composition of the plated film forming the main magnetic pole film.

In addition, since the electrode film, which is a seed film for plating, is an alloy film of at least one element selected from the platinum group and nickel (Ni), the adhesion strength of the electrode film to an underlying inorganic insulating film. Therefore, the film peeling of the electrode film and the overlying plated film is prevented to achieve a stable head production process.

From a pragmatic standpoint, the plated film formed on the electrode film is preferably a magnetic pole film with a saturation magnetic flux density equal to or greater than 2.3 T. If the saturation magnetic flux density is equal to or greater than 2.3 T, decrease in coercive force can be achieved even allowing for the future development of the technology, not to mention meeting the demand of increase in recording density.

Magnetic heads of this type are generally of the complex type including the above perpendicular recording element and a reproducing element. As the reproducing element, there may be employed a giant magneto-resistive effect element (GMR) or a ferromagnetic tunnel junction element (TMR).

The present invention also discloses a head assembly and a magnetic recording/reproducing apparatus. The head assembly includes the above magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

The magnetic recording/reproducing apparatus according to the present invention includes the above head assembly and a magnetic recording medium. A typical example of the magnetic recording/reproducing apparatus is a hard disk drive (HDD) using a magnetic recording medium called "hard disk".

The other objects, constructions and advantages of the present invention will be further detailed below with reference to the attached drawings. However, the attached drawings show only illustrative examples.

DESCRIPTION OF THE PREFERRED EMBODIMENTS

1. Magnetic Head

Figure 1:
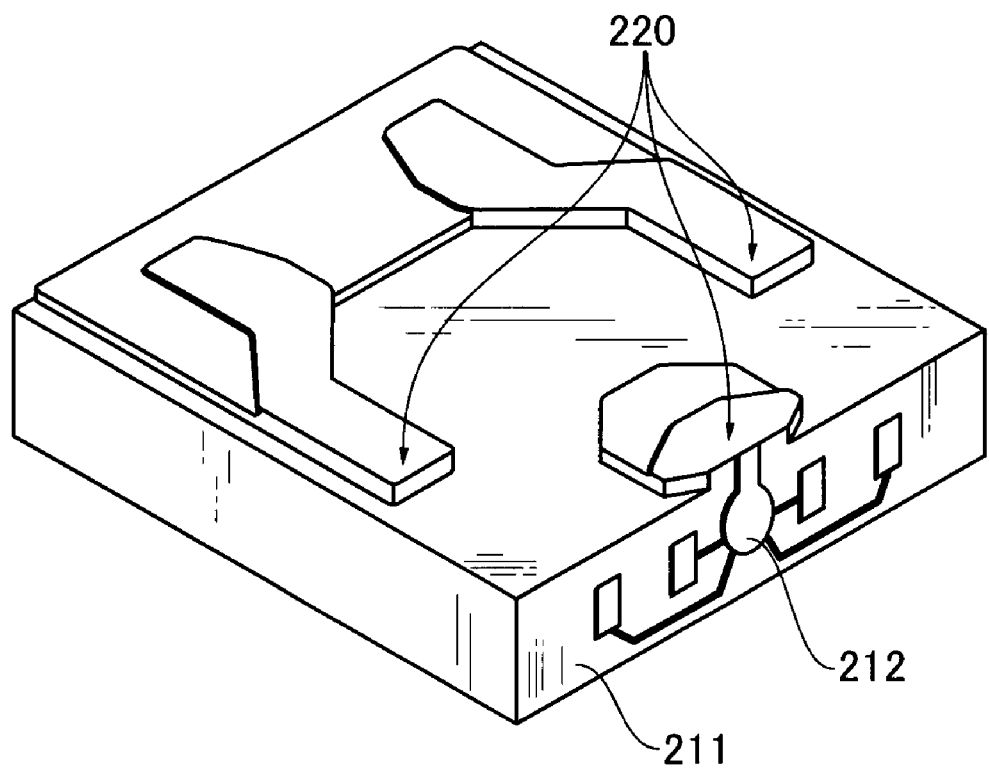
FIG. 1 is a perspective view of a magnetic head according to the present invention.
Figure 2:
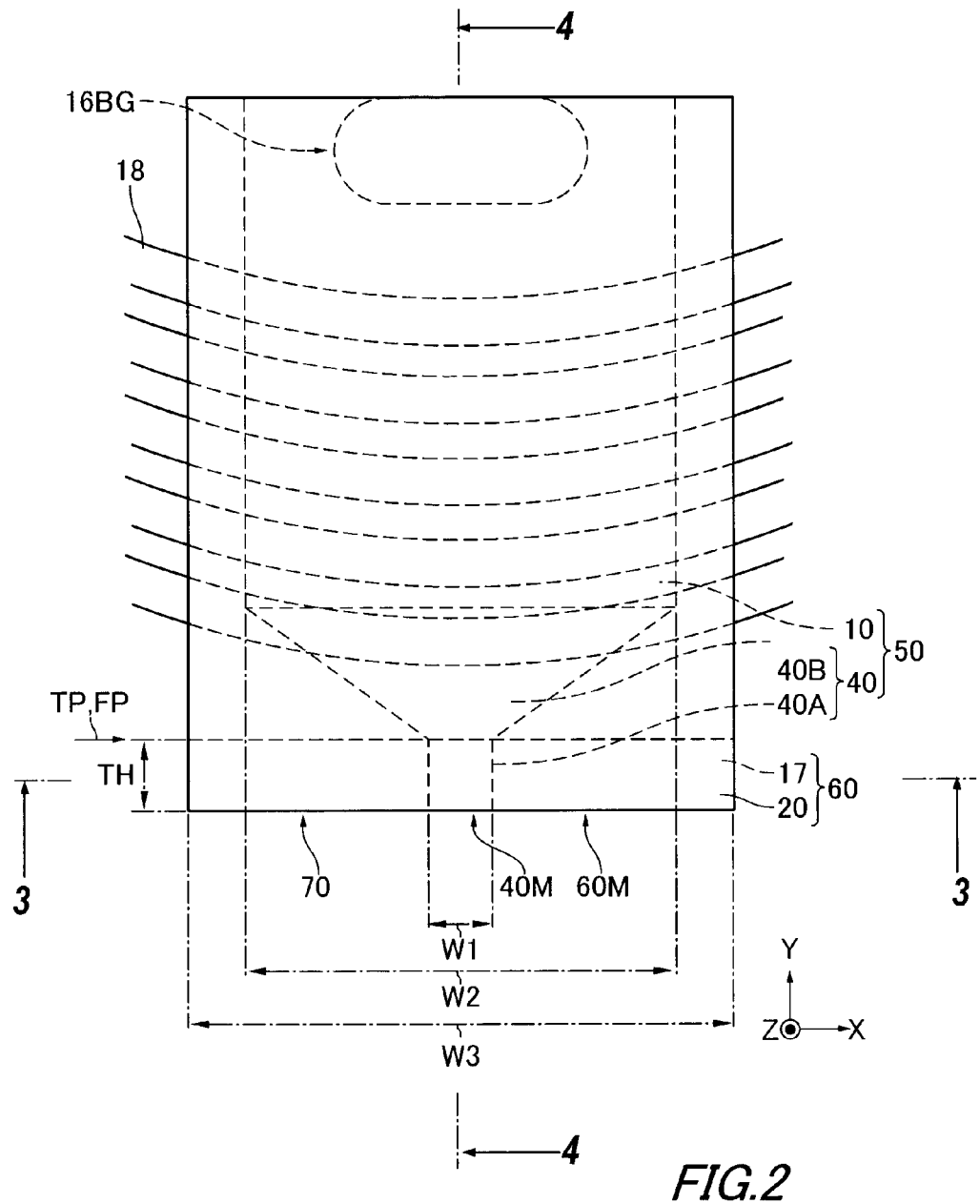
FIG. 2 is a plan view schematically showing a part of a perpendicular recording element contained in a magnetic head according to the present invention.
Figure 3:
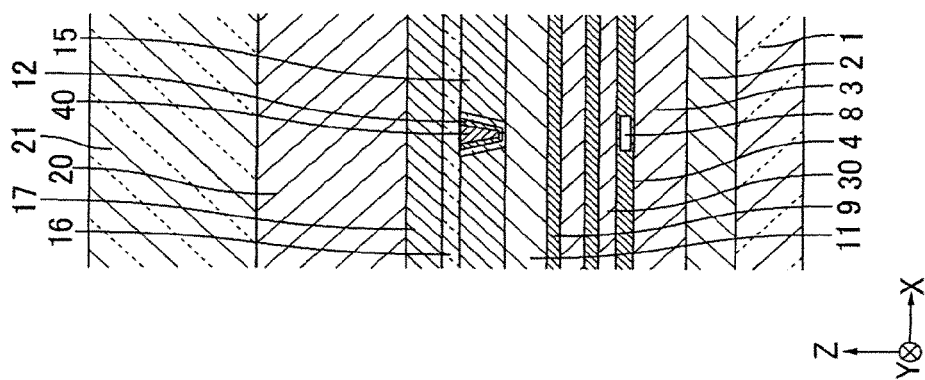
FIG. 3 is a sectional view taken along line 3-3 in FIG. 2.

FIGS. 1 to 3 show a magnetic head to be used in combination with a rapidly spinning magnetic recording medium such as a hard disk. Magnetic heads of this type are generally called "floating-type". However, the magnetic head according to the present invention is not necessarily required to be of the floating-type. For example, it may be a magnetic head which comes into contact with a magnetic recording medium.

In the magnetic head, referring first to FIG. 1, a thin-film element 212 for performing both recording and reproducing processes is attached to one face of a substrate 211 made of, for example, a non-magnetic insulating material such as AlTiC to have a generally rectangular prism structure. The substrate 211 has an air bearing surface 220 directly related to the floating characteristics, and the thin-film element 212 is attached to another face perpendicular to the air bearing surface 220.

Figure 4:
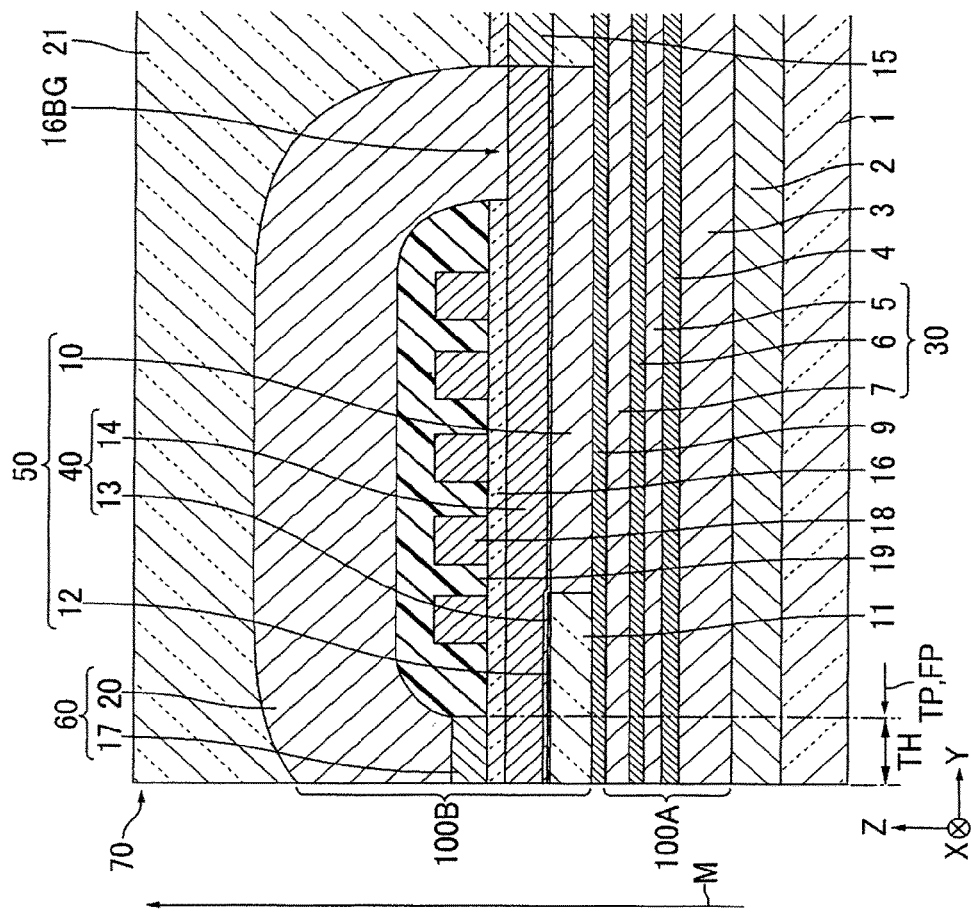
FIG. 4 is a sectional view taken along line 4-4 in FIG. 2.

Details of the thin-film element 212 are shown in FIGS. 2 to 4. In FIGS. 2 to 4, dimensions along X, Y and Z axes are called "width", "length" and "thickness/height", respectively. Along the Y axis, moreover, one side close to an air bearing surface 70 and the other side remote therefrom are designated by "front" and "rear", respectively, and being positioned forward and being positioned rearward are expressed by "project" and "recede", respectively.

The magnetic head shown in FIGS. 2 to 4 is a complex-type head which can perform both recording and reproducing. In the magnetic head, an insulating film 2, a reproducing head portion 100A using magneto-resistive effect (MR effect), a separating film 9, a recording head portion 100B for performing a recording process in a perpendicular recording method, and an overcoat film 21 are layered on a substrate 1 in the mentioned order.

The substrate 1 is made of, for example, a ceramic material such as AlTiC ($Al_2O_3.TiC$), while the insulating film 2, the separating film 9 and the overcoat film 21 are made of, for example, a non-magnetic insulating material such as aluminium oxide ($Al_2O_3$: hereinafter merely referred to as "alumina").

The reproducing head portion 100A is formed, for example, by layering a lower read shield film 3, a shield gap film 4, and an upper read shield film 30 in the mentioned order. In the shield gap film 4, a reproducing element (or MR element 8) is embedded in such a manner as to be exposed on the air bearing surface 70. The air bearing surface 70 is uniquely defined with reference to one end face of the substrate 1 supporting a series of components from the insulating film 2 to the overcoat film 21, more specifically, refers to a surface containing one end face of the substrate 1.

Both the lower read shield film 3 and the upper read shield film 30 function to magnetically separate the MR element 8 from the surroundings and extend rearward from the air bearing surface 70. The lower read shield film 3 is made of, for example, a magnetic material such as a nickel (Ni)-iron alloy (NiFe). In this case, the nickel (Ni)-iron alloy (NiFe) may have a composition ratio of 80 wt. % of Ni and 20 wt. % of Fe. The upper read shield film 30 is formed, for example, by layering two upper read shield film portions 5, 7 with a non-magnetic film 6 interposed therebetween. Both the upper read shield film portions 5, 7 are made of, for example, a magnetic material such as a nickel (Ni)-iron alloy. The non-magnetic film 6 is made of, for example, a non-magnetic material such as ruthenium (Ru) or alumina. The upper read shield film 30 is not necessarily required to have a layered structure but may have a single film structure of a magnetic material.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording head portion 100B is a so-called shield-type perpendicular recording element including a non-magnetic film 11, a first non-magnetic film 15, a magnetic pole film 50, a gap film 16 with an opening (or back gap 16BG) for magnetic connection, a coil film 18 embedded in an insulating film 19, and a magnetic film 60.

The magnetic pole film 50 extends rearward from the air bearing surface 70. The magnetic pole film 50 includes an auxiliary magnetic pole film 10, a second non-magnetic film 12, and a main magnetic pole film 40.

The auxiliary magnetic pole film 10 extends from behind the air bearing surface 70 to the back gap 16BG. For example, the auxiliary magnetic pole film 10 is disposed on the leading side with respect to the main magnetic pole film 40 and has a rectangular plan shape (width W2), as shown in FIG. 2. The non-magnetic film 11 functions to electrically and magnetically separate the auxiliary magnetic pole film 10 from the surroundings and is made of, for example, a non-magnetic insulating material such as alumina.

For example, the second non-magnetic film 12 extends from the air bearing surface 70 to the forefront position of the auxiliary magnetic pole film 10 for connecting the auxiliary magnetic pole film 10 and the main magnetic pole film 40 and is made of a non-magnetic insulating material such as alumina or aluminium nitride. However, the extent of the second non-magnetic film 12 may be set arbitrarily.

The sectional shape of the second non-magnetic film 12 parallel to the air bearing surface 70 is U-shaped, as shown in FIG. 3, and the main magnetic pole film 40 (front end portion 40A described below) is embedded inside the second non-magnetic film 12. The second non-magnetic film 12 is formed, for example, by ALD to have a uniform thickness around the main magnetic pole film 40 (along its bottom face and both side faces).

The first non-magnetic film 15 functions to electrically and magnetically separate the main magnetic pole film 40 from the surroundings. The first non-magnetic film 15 is embedded outside the second non-magnetic film 12 and is made of, for example, a non-magnetic insulating material such as alumina.

The first and second non-magnetic films 15, 12 are each made of a non-magnetic insulating material but have different compositions because of their different formation methods. More specifically, the first non-magnetic film 15 is formed such as by sputtering using an inert gas and contains the inert gas because of its formation method. It should be noted that examples of the inert gas include argon (Ar), krypton (Kr) and xenon (Xe). On the other hand, the second non-magnetic film 12 is formed such as by ALD not using any inert gas and contains no inert gas because of its formation method. Whether the first and second non-magnetic films 15, 12 contain any inert gas or not can be determined by using a composition analysis method such as scanning transmission electron microscopy (STEM)—energy-dispersive X-ray spectroscopy (EDS).

The first and second non-magnetic films 15, 12 are also different in the content of specific components because of their different formation methods. More specifically, since water and trimethyl aluminium (TMA) are used in ALD but not used in sputtering, the content of hydrogen (H) is larger in the second non-magnetic film 12 than in the first non-magnetic film 15.

The main magnetic pole film 40 extends from the air bearing surface 70 to the back gap 16BG. The main magnetic pole film 40 includes, for example, the front end portion 40A extending rearward from the air bearing surface 70 and a rear end portion 40B connected to the rear end of the front end portion 40A, as shown in FIG. 2. The front end portion 40A is a substantial magnetic flux emitting portion (so-called magnetic pole film) and has a constant width W1 which defines the recording track width. The rear end portion 40B is a portion intended to supply a magnetic flux to the front end portion 40A and has a width W2 larger than the width W1. The width of the rear end portion 40B is, for example, constant (width W2) at its rear portion and decreases in its front portion toward the front end portion 40A. The position where the width of the main magnetic pole film 40 starts to increase from W1 to W2 is a so-called flare point FP.

Figure 5:
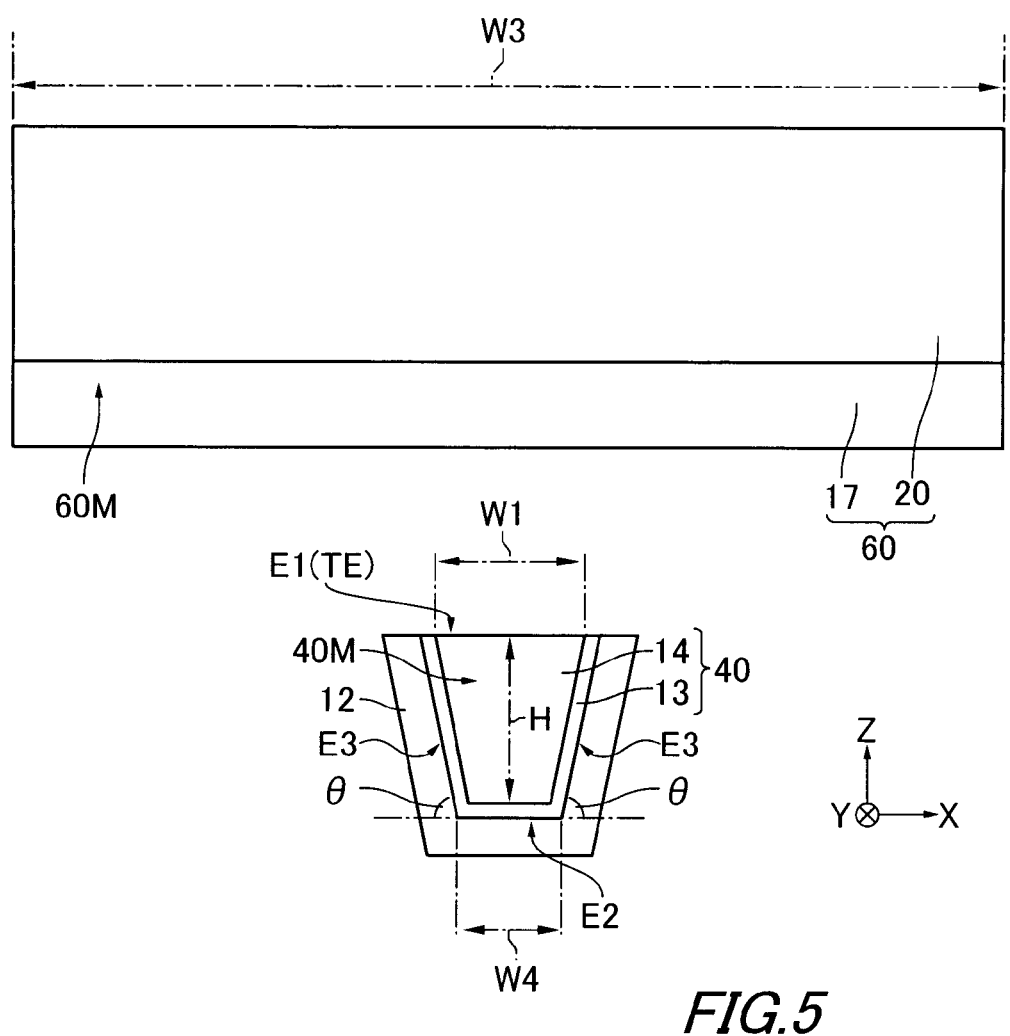
FIG. 5 is an end view showing a magnetic pole structure of the perpendicular recording element of the magnetic head shown in FIGS. 1 to 4.

An end face 40M of the main magnetic pole film 40 on the side close to the air bearing surface 70 is of, for example, an inverted trapezoid shape (height H), whose upper bottom and lower bottom are the longer side on the trailing side and the shorter side on the leading side, respectively, as shown in FIG. 5. Concretely, the end face 40M has a shape defined by an upper end edge E1 (width W1) on the trailing side, a lower end edge E2 (width W4) on the leading side, and two side edges E3, wherein the width W4 is smaller than the width W1. The upper end edge E1 is a substantial recording portion of the magnetic pole film 50, and its width W1 is approximately 0.2 µm or less. The bevel angle θ of the end face 40M (or angle between a direction along which the lower end edge E2 extends and the side edge E3) may be set arbitrarily, for example, within the range of less than 90 degrees.

The gap film 16 is a gap for magnetically separating the magnetic pole film 50 and the magnetic film 60 and is made of, for example, a non-magnetic insulating material such as alumina or a non-magnetic conductive material such as ruthenium. The thickness of the gap film 16 is approximately 0.03 to 0.1 µm.

The coil film 18 functions to generate a magnetic flux and is made of, for example, a highly conductive material such as copper (Cu). The coil film 18 is wound around the back gap 16BG to have a winding structure (or spiral structure), as shown in FIG. 2.

The insulating film 19 functions to electrically separate the coil film 18 from the surroundings and is made of, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called "throat height TH". For example, FIG. 2 shows a state where the throat height zero position TP matches the flare point FP.

The magnetic film 60 functions to absorb a spreading component of a magnetic flux emitted from the magnetic pole film 50 so as to increase the gradient of the perpendicular magnetic field and also absorb a magnetic flux returning from the recording medium so as to circulate the magnetic flux between the recording head portion 100B and a recording medium 80. The magnetic film 60, which extends rearward from the air bearing surface 70 on the trailing side of the magnetic pole film 50, is separated from the magnetic pole film 50 by the gap film 16 at its front but connected to the magnetic pole film 50 through the back gap 16BG at its rear. On the side close to the air bearing surface 70, the magnetic film 60 has an end face 60M which is, for example, of a rectangular shape having a width W3 larger than the width W1, as shown in FIG. 2. The magnetic film 60 includes, for example, a write shield film 17 and a return yoke film 20 which are distinct from each other.

The write shield film 17 functions to mainly increase the gradient of the perpendicular magnetic field and is made of, for example, a high saturation magnetic flux density material such as a nickel (Ni)-iron alloy or an iron-based alloy. Particularly by absorbing a spreading component of a magnetic flux emitted from the magnetic pole film 50, the write shield film 17 functions to: (1) increase the magnetic field gradient of the perpendicular magnetic field; (2) decrease the recording width; and (3) incorporate an oblique magnetic field component into the perpendicular magnetic field. However, the write shield film 17 may additionally function to circulate the magnetic flux like the return yoke film 20. The write shield film 17 is adjacent to the gap film 16 and extends rearward from the air bearing surface 70 to have its rear end adjacent to the insulating film 19. Thus, the write shield film 17 serves to define the forefront position (throat height zero position TP) of the insulating film 19.

The return yoke film 20 functions to circulate the magnetic flux and is made of, for example, a magnetic material similar to that of the write shield film 17. The return yoke film 20 extends from the air bearing surface 70, through above the insulating film 19, to the back gap 16BG on the trailing side of the write shield film 17 and is connected to the write shield film 17 at its front but to the magnetic pole film 50 at its rear through the back gap 16BG, as shown in FIG. 4.

The overcoat film 21 functions to protect the magnetic head and is made of, for example, a non-magnetic insulating material such as alumina.

Figure 6:
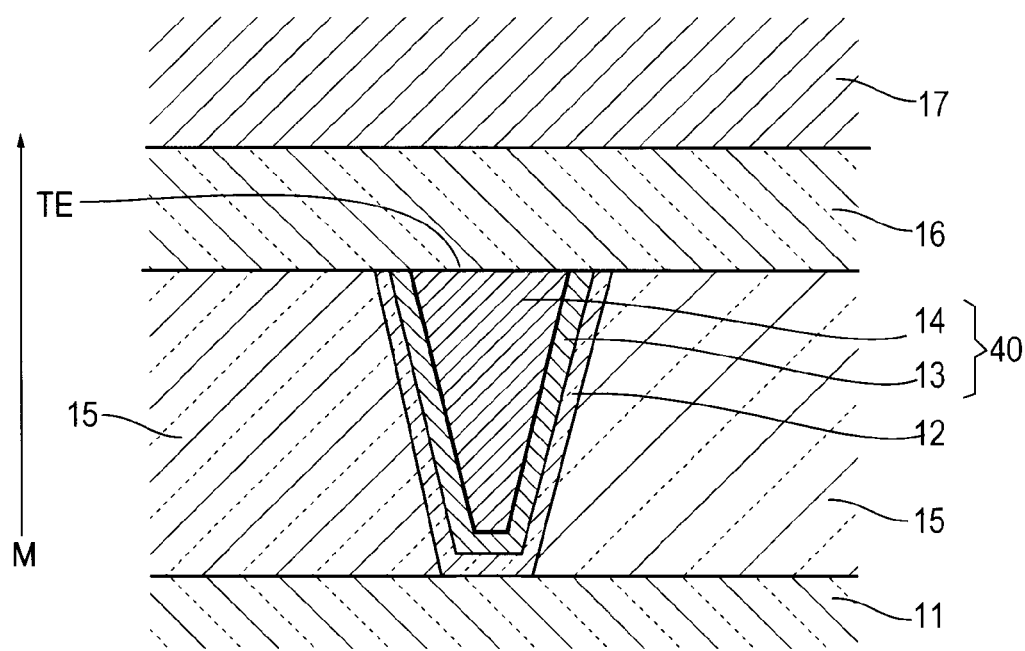
FIG. 6 is an enlarged sectional view at a magnetic pole portion.

Next will be described the main magnetic pole film 40, which is a feature of the present invention, with reference to FIG. 6. The main magnetic pole film 40 includes an electrode film 13 and a plated film 14. The electrode film 13 is used for growing the plated film 14 in the production process of the magnetic head. The feature of the present invention resides in that the electrode film 13 is formed by an alloy film of at least one element selected from the platinum group and nickel (Ni).

In the magnetic head according to the present invention, since the electrode film 13, which functions as a seed film upon formation of the plated film 14 as a magnetic film that becomes a main portion of the main magnetic pole film, is formed by an alloy film of at least one element selected from the platinum group and nickel (Ni), the electrode film 13 becomes a non-magnetic film. Thus, the electrode film 13 is excluded from the elements which determine magnetic properties of the main magnetic pole film, i.e., saturation magnetic flux density and coercive force. The saturation magnetic flux density and coercive force of the main magnetic pole film are predominantly determined by magnetic properties of the plated film 14 formed on the electrode film 13. Accordingly, the saturation magnetic flux density can be set to a required value and the coercive force can be decreased to a desired value by appropriately selecting the material and composition of the plated film 14.

Figure 7:
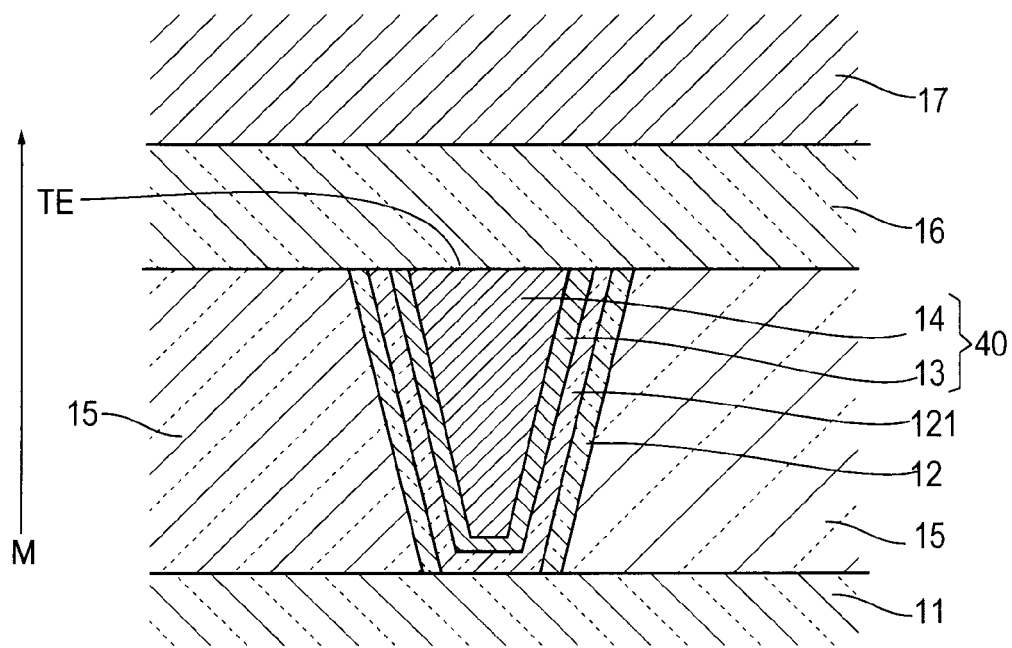
FIG. 7 is an enlarged sectional view at a magnetic pole portion according to another embodiment.

In addition, since the electrode film 13, which is a seed film for plating, is an alloy film of at least one element selected from the platinum group and nickel (Ni), the adhesion strength of the electrode film 13 to an underlying inorganic insulating film. Therefore, the film peeling of the electrode film 13 and the overlying plated film 14 is prevented to achieve a stable head production process. From the viewpoint of increasing the adhesion strength of the electrode film 13 and the plated film 14 and thereby preventing the film peeling, it is also effective to dispose an adhesive film 121 between the electrode film 13 and the underlying second non-magnetic film 12 for enhancing the adhesion strength, as shown in FIG. 7.

As is generally known, the platinum group includes five elements: ruthenium (Ru), rhodium (Rh), palladium (Pd), osmium (Os), and iridium (Ir). Basically, all these elements can be used in the present invention. Among them, palladium (Pd) is suitable. However, even if the electrode film 13 is formed by a PdNi alloy film, the overwrite characteristic (OW), the pole erase (PE) and the film peeling may have different results depending on its composition.

Table 1 shows experimental results about the effects of material and composition of the electrode film 13 on the overwrite characteristic (OW), the pole erase (PE) and the film peeling. For each Samples S1 to S4 and S8 to S10, one hundred samples were used in an experiment. The pole erase (PE) expresses the ratio of samples ranked A or B to all samples in percentage, where samples are ranked A when the number of sectors having caused an error during writing onto a magnetic recording medium is "0", and ranked B when less than 6%.

TABLE 1

| Sample No. | Electrode film | Plated film | OW | PE | Film peeling |
|---|---|---|---|---|---|
| S1 | $Ni_{80}Fe_{20}$ | $Fe_{90}Ni_{10}$ | 28 dB | 100% | No |
| S2 | $Ni_{80}Fe_{20}$ | $Fe_{62}Co_{35}Ni_3$ | 32 dB | 95% | No |
| S3 | $Fe_{65}Co_{35}$ | $Fe_{90}Ni_{10}$ | 35 dB | 97% | No |
| S4 | $Fe_{65}Co_{35}$ | $Fe_{62}Co_{35}Ni_3$ | 40 dB | 65% | No |
| S5 | Pd | $Fe_{90}Ni_{10}$ | | | Yes |
| S6 | Pd | $Fe_{62}Co_{35}Ni_3$ | | | Yes |
| S7 | $Pd_{98}Ni_2$ | $Fe_{62}Co_{35}Ni_3$ | | | Yes |
| S8 | $Pd_{95}Ni_5$ | $Fe_{62}Co_{35}Ni_3$ | 40 dB | 92% | No |
| S9 | $Pd_{90}Ni_{10}$ | $Fe_{62}Co_{35}Ni_3$ | 39 dB | 90% | No |
| S10 | $Pd_{80}Ni_{20}$ | $Fe_{62}Co_{35}Ni_3$ | 38 dB | 91% | No |

For reference, magnetic properties of typical films are shown in Table 2.

TABLE 2

| Material | Process | Bs | Hce | Hch |
|---|---|---|---|---|
| $Ni_{80}Fe_{20}$ | Sputtering | 1.0 T | 2-3 Oe | ~0 Oe |
| $Fe_{65}Co_{35}$ | Sputtering | 2.4 T | 32 Oe | 23 Oe |
| $Fe_{90}Ni_{10}$ | Plating | 2.0 T | 2-3 Oe | <1 Oe |
| $Fe_{62}Co_{35}Ni_3$ | Plating | 2.3 T | 12 Oe | 2-3 Oe |

In Table 2, any sample had a film thickness of approximately 0.5 μm and was subjected to a 225 degree C., 3 hour, 200 (Oe) anneal. Hce represents a coercive force along an easy axis, while Hch represents a coercive force along a hard axis.

Referring to Table 1, in Sample S1 in which both the electrode film 13 and the plated film 14 were made of a NiFe alloy, the pole erase characteristic (PE) was excellent because the saturation magnetic flux density of the main magnetic pole film was 2.0 T, but the overwrite characteristic (OW) was as extremely low as 28 dB.

A similar tendency can be observed in Sample S2 in which the electrode film 13 was made of a NiFe alloy and the plated film 14 was formed by a FeCoNi alloy film and Sample S3 in which the electrode film 13 was formed by a FeCo alloy film and the plated film 14 was formed by a FeNi alloy film.

In sample S4 in which the electrode film 13 was made of a FeCo alloy and the plated film 14 was formed by a FeCoNi alloy film, the overwrite characteristic (OW) was high, but the pole erase characteristic (PE) was as extremely low as 65%.

In Samples S5 to S6 in which the electrode film 13 was formed by a Pd film, the film peeling occurred because of insufficient adhesion strength of the electrode film 13.

In Samples S8 to S10 in which the electrode film 13 was formed by a PdNi alloy film, on the other hand, the overwrite characteristic (OW) was as high as 38 to 40 dB, the pole erase characteristic (PE) was also at a high level of 90 to 92%, and no film peeling has occurred.

In Table 1, furthermore, even in the cases where the electrode film 13 was formed by a PdNi film, no film peeling has occurred in Samples S8 to S10 in which the Ni composition was in the range of 5 to 20 at. %, although the film peeling occurred in Sample S7 in which the Ni composition was as low as 2 at. %. That is, it is seen from Table 1 that the Ni composition of the PdNi film has to be equal to or greater than 5 at. % to prevent the film peeling. It is not preferred that the Ni composition exceeds 23 at. % because the electrode film 13 will exhibit the properties of a magnetic film. In view of safety, the Ni composition is preferably equal to or less than 20 at. %.

In sum, the preferred example of the electrode film 13 is a PdNi alloy film containing Pd in the range of 95 to 80 at. % and Ni in the range of 5 to 20 at. %. This preferred electrode film 13 prevents the film peeling, which makes it possible to achieve a stable head production process.

From the viewpoint of increasing the adhesion strength of the electrode film 13 and the magnetic pole film and thereby preventing the film peeling, it is effective to dispose the adhesive film 121 between the electrode film 13 and the second non-magnetic film 12 for enhancing the adhesion strength of the electrode film 13, as shown in FIG. 7.

In the present invention, furthermore, a magnetic pole film whose saturation magnetic flux density is equal to or greater than 2.3 T is grown on the electrode film 13 as the plated film 14. In the magnetic head according to the present invention, accordingly, the perpendicular magnetic recording function is predominantly performed by the plated film 14 with a saturation magnetic flux density equal to or greater than 2.3 T. If the saturation magnetic flux density is equal to or greater than 2.3 T, decrease in coercive force can be achieved in response to the future development of the technology, not to mention meeting the demand of increase in recording density.

For the plated film 14, a FeCoNi alloy film is suitable. However, the plated film 14 may be of other magnetic materials as long as satisfying the saturation magnetic flux density of 2.3 T. When a FeCoNi alloy film is used as the plated film 14, a suitable composition for setting the saturation magnetic flux density equal to or greater than 2.3 T may be found from the ternary system diagram of Fe, Co and Ni shown in FIG. 8.

Figure 8:
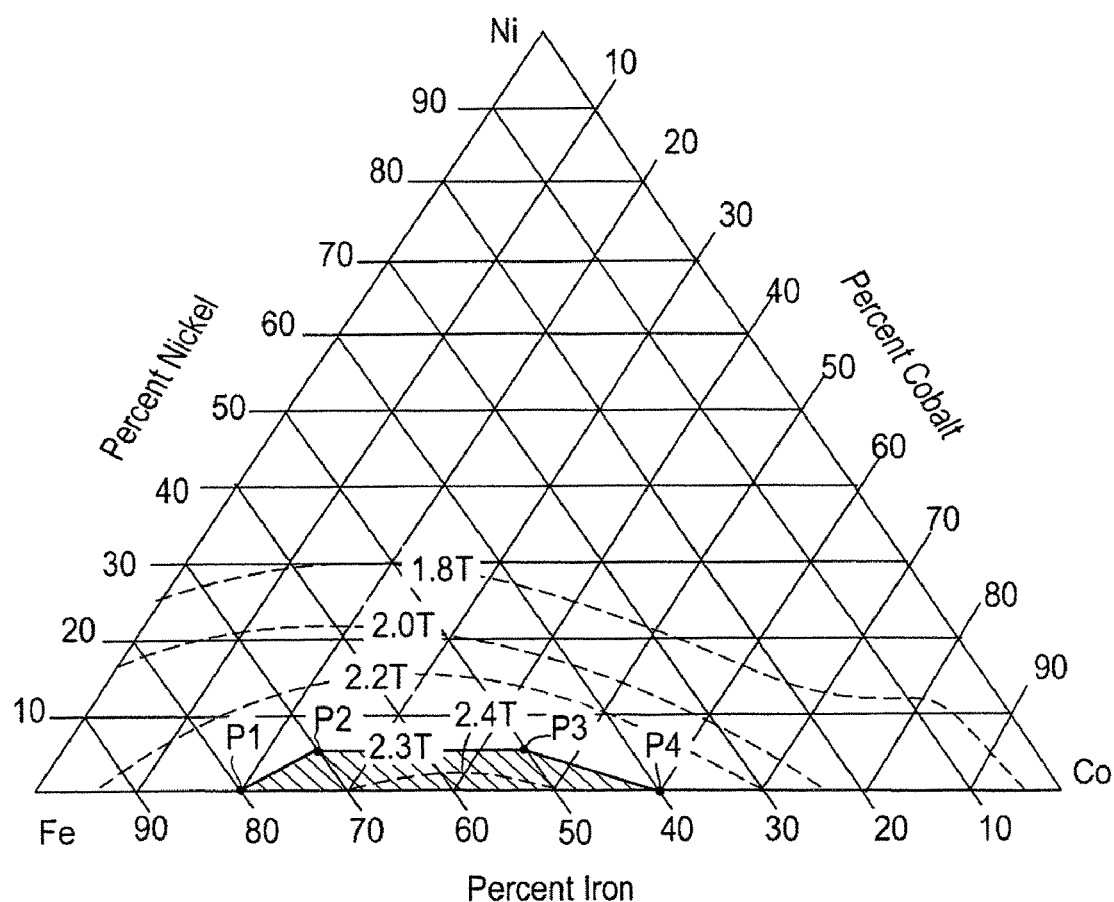
FIG. 8 is a ternary system diagram of Fe, Co and Ni.

Referring to FIG. 8, the area with a saturation magnetic flux density equal to or greater than 2.3 T is a hatched area enclosed by lines connecting:

Point P1 indicating the composition of $Fe_{80}Co_{20}$;

Point P2 indicating the composition of $Fe_{70}Co_{25}Ni_5$;

Point P3 indicating the composition of $Fe_{50}Co_{45}Ni_5$; and

Point P4 indicating the composition of $Fe_{40}Co_{60}$.

The hatched area is the range of:

40 at. %≦Fe≦80 at. %; 20 at. %≦Co≦60 at. %; and 0 at. %≦Ni≦5 at. %. Among them, particularly preferred is a FeCoNi alloy plated film 14 containing 62 at. % Fe, 35 at. % Co, and 3 at. % Ni.

When the plated film 14 is made of a FeCoNi alloy, its preferred combination with the electrode film 13 is achieved by using the PdNi alloy film with the preferred composition range described above with reference to Table 1 as the electrode film 13. A particularly preferred combination is a combination of the plated film 14 having a composition of 62 at. % Fe, 35 at. % Co, and 3 at. % Ni and the electrode film 13 having a composition of Pd in the range of 95 to 80 at. % and Ni in the range of 5 to 20 at. %.

Table 3 shows the composition, as well as the overwrite characteristic (OW) and the pole erase characteristic (PE), of Samples S21 to S26 which are within the limits of the above-mentioned combination.

TABLE 3

| Sample No. | Electrode film | Plated Film | OW | PE |
|---|---|---|---|---|
| S21 | $Pd_{90}Ni_{10}$ | $Fe_{62}Co_{35}Ni_3$ | 39 dB | 90% |
| S22 | $Pd_{90}Ni_{10}$ | $Fe_{65}Co_{32}Ni_3$ | 40 dB | 92% |
| S23 | $Pd_{90}Ni_{10}$ | $Fe_{70}Co_{28}Ni_2$ | 38 dB | 94% |
| S24 | $Pd_{90}Ni_{10}$ | $Fe_{56}Co_{40}Ni_4$ | 39 dB | 85% |
| S25 | $Pd_{90}Ni_{10}$ | $Fe_{45}Co_{55}$ | 37 dB | 80% |
| S26 | $Pd_{90}Ni_{10}$ | $Fe_{75}Co_{25}$ | 38 dB | 93% |

As shown in Table 3, Sample S21 to S26, in which the plated film 14 having a composition of 62 at. % Fe, 35 at. % Co, and 3 at. % Ni was combined with the electrode film 13 having a composition of Pd in the range of 95 to 80 at. % and Ni in the range of 5 to 20 at. %, had a high overwrite characteristic (OW) of 39 to 40 dB and an excellent pole erase characteristic (PE) of 80 to 94%.

In sum, the advantages obtained by using a magnetic film with a saturation magnetic flux density equal to or greater than 2.3 T as the plated film 14 are as follows.

(a) As compared with a magnetic head in which a magnetic pole film comprising a FeCoNi alloy plated film 14 with a saturation magnetic flux density of 2.3 T is formed on a FeCo alloy electrode film 13 with a saturation magnetic flux density of 2.4 T, comparable overwrite characteristic (OW) can be obtained, and the coercive force can be decreased to thereby improve the pole erase characteristic.

(b) As compared with a magnetic head in which a magnetic pole film comprising a FeNi alloy plated film 14 with a saturation magnetic flux density of 2.0 T is formed on a FeCo alloy electrode film 13 with a saturation magnetic flux density of 2.4 T, comparable pole erase characteristic can be obtained, and the overwrite characteristic (OW) can be improved.

(c) As compared with a case in which the electrode film 13 and the plated film 14 are made of a FeCo alloy with a saturation magnetic flux density of 2.4 T, the pole erase characteristic can be considerably improved.

(d) As compared with a case in which the electrode film 13 is made of a FeNi alloy plated film 14 with a saturation magnetic flux density of 2.0 T, the overwrite characteristic (OW) can be improved.

Figure 10:
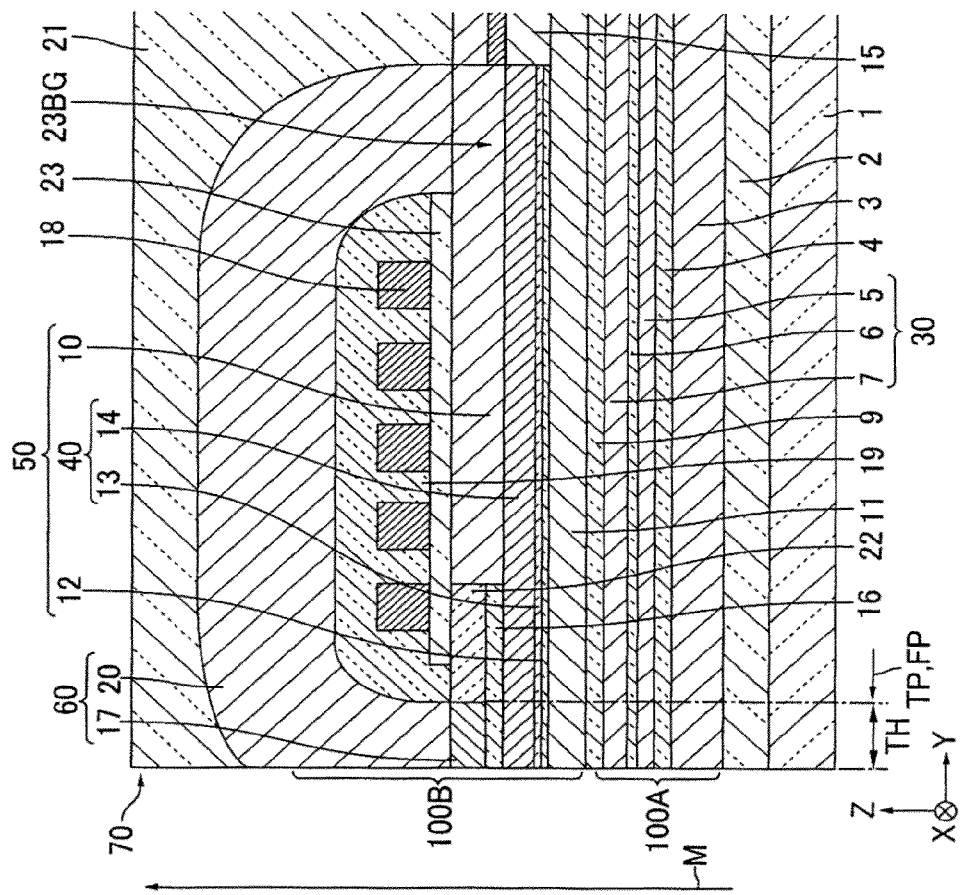
FIG. 10 is a sectional view taken along line 4-4 in FIG. 2 according to still another embodiment.
Figure 9:
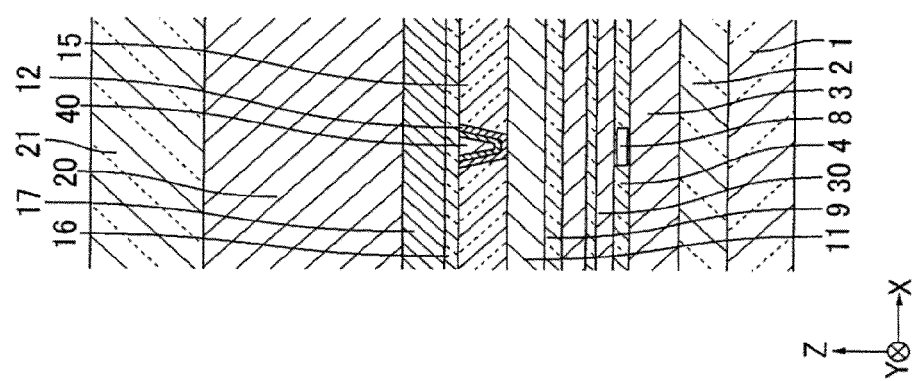
FIG. 9 is a sectional view taken along line 3-3 in FIG. 2 according to still another embodiment.

In the embodiments shown in FIGS. 1 to 7, the auxiliary magnetic pole film 10 is disposed on the leading side with respect to the main magnetic pole film 40, but is not necessarily limited thereto. For example, the auxiliary magnetic pole film 10 may be disposed on the trailing side with respect to the main magnetic pole film 40, as shown in FIGS. 9 and 10. In this case, since the auxiliary magnetic pole film 10 is disposed on the main magnetic pole film 40, the gap film 16 is partially removed within the area where the auxiliary magnetic pole film 10 is present.

In addition, a non-magnetic film 22 is embedded around the auxiliary magnetic pole film 10 to substantially define the throat height zero position TP, and an insulating film 23 is disposed between the auxiliary magnetic pole film 10 and the coil film 18 to electrically separate the coil film 18 from the auxiliary magnetic pole film 10. The non-magnetic film 22 and the insulating film 23 are made of, for example, a non-magnetic insulating material similar to that of the non-magnetic films 11, 15. The return yoke film 20 is connected at its rear to the auxiliary magnetic pole film 10. The surfaces of the auxiliary magnetic pole film 10, the write shield film 17 and the insulating film 22 are preferably flattened. In addition, the second non-magnetic film 12 may extend, for example, to a back gap 23BG like the main magnetic pole film 40. Also in this case, the same effects can be obtained.

2. Method for Manufacturing the Magnetic Head

Next will be described a method for manufacturing the magnetic head according to the present invention with reference to FIGS. 11 to 22. The manufacturing method according to the present invention is particularly directed to a perpendicular recording element manufacturing method in the production process of the magnetic head. The processes before the production process of the perpendicular recording element have been known heretofore and do not require specific description. Roughly speaking, it can be manufactured by layering a series of components in order by using a conventional thin-film process including a film formation technique such as plating or sputtering, a patterning technique such as photolithography, an etching technique such as dry etching or wet etching, and a polishing technique such as CMP (chemical mechanical polishing).

Roughly speaking with reference to FIGS. 1 to 9 and so on, when manufacturing the magnetic head, at first, the insulating film 2 is formed on the substrate 1, and then the lower read shield film 3, the shield gap film 4 embedded with the MR element 8, and the upper read shield film 30 (the upper read shield film portions 5, 7 and the non-magnetic film 6) are deposited on the insulating film 2 in the mentioned order, thereby forming the reproducing head portion 10A.

Subsequently, the separating film 9 is formed on the reproducing head portion 10A, and then the magnetic pole film 50 (the auxiliary magnetic pole film 10, the second non-magnetic film 12, and the main magnetic pole film 40) enclosed with the non-magnetic films 11, 15, the gap film 16, the coil film 18 covered with the insulating film 19, and the magnetic film 60 (the write shield film 17 and the return yoke film 20) are deposited on the separating film 9 in the mentioned order, thereby forming the recording head portion 100B. Finally, the overcoat film 21 is formed on the recording head portion 100B, and then the air bearing surface 70 is formed by using a machining process or a polishing process, thereby completing the magnetic head.

Figure 11:
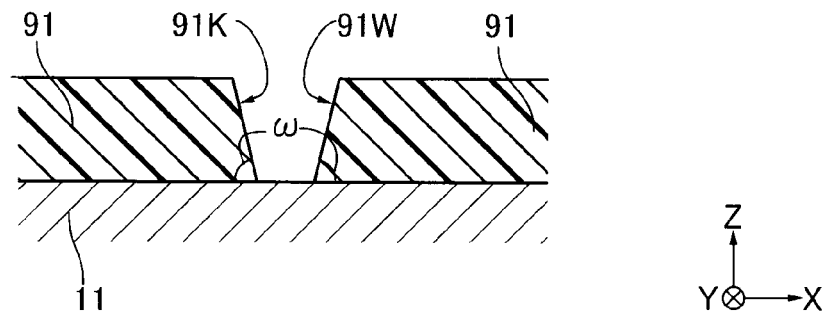
FIG. 11 is a view showing a step for manufacturing the magnetic head shown in FIGS. 1 to 7.

When manufacturing the perpendicular recording element of the magnetic head, which is the subject of the present invention, at first, after formation of the non-magnetic film 11, a resist pattern 91 is formed on the non-magnetic film 11 to have an opening 91K, as shown in FIG. 11. Upon formation of the resist pattern 91, a resist film is formed by applying a resist onto the non-magnetic film 11 and then subjected to patterning (exposure and development) by using photolithography. In this case, exposure conditions are adjusted such that the opening 91K spreads with distance from the non-magnetic film 11 and an inclination ω of an inner wall 91W (or angle between the inner wall 91W and the surface of the non-magnetic film 11) is equal to the bevel angle θ (see FIG. 5).

Figure 12:
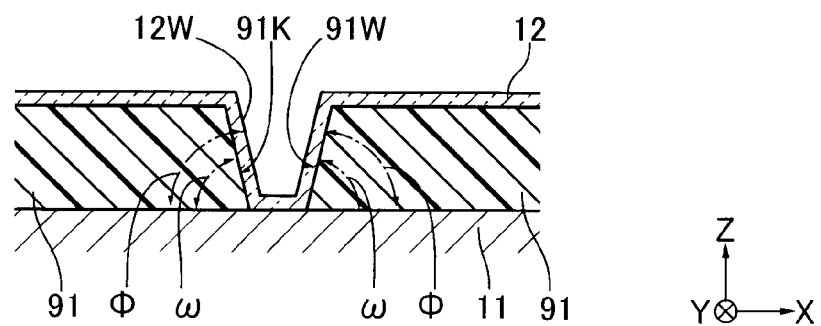
FIG. 12 is a view showing a step after the step shown in FIG. 11.

Thereafter, as shown in FIG. 12, the second non-magnetic film 12 is formed in such a manner as to narrow the opening 91K by covering at least the inner wall 91W of the resist pattern 91 in the opening 91K using a dry film formation method.

Upon formation of the second non-magnetic film 12, for example, the surface of the resist pattern 91 (including the inner wall 91W) and the exposed surface of the non-magnetic film 91 in the opening 91K are covered using ALD. Particularly in this case, the film formation temperature (so-called substrate temperature) by ALD should be lower than the deformation temperature (or glass transition temperature) of the resist pattern 91. Since the use of ALD results in that the second non-magnetic film 12 covers the inner wall 91W with an uniform thickness, an inclination (D of an inner wall 12W of the second non-magnetic film 12 corresponding to the inner wall 91W (or angle between the inner wall 12W and the surface of the non-magnetic film 11) is equal to the inclination ω.

Figure 13:
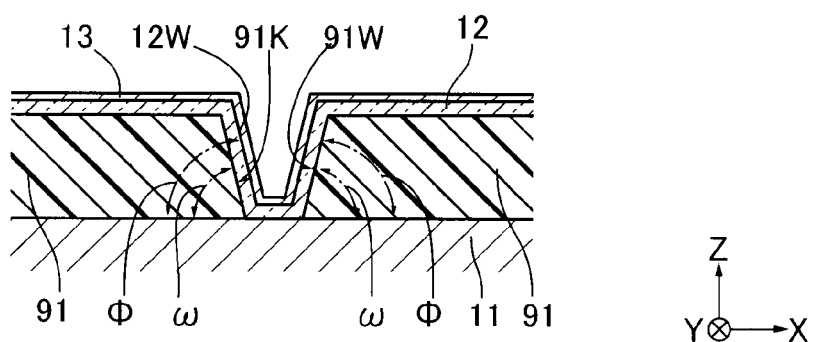
FIG. 13 is a view showing a step after the step shown in FIG. 12.

Then, a magnetic film for formation of the main magnetic pole film 40 is formed in such a manner as to fill at least the opening 91K where the second non-magnetic film 12 is formed. Concretely, for example, the electrode film 13 is formed on the second non-magnetic film 12 by using sputtering, as shown in FIG. 13. The electrode film 13 is an alloy film of at least one element selected from the platinum group and Ni, and its material composition has been described hereinabove.

Figure 14:
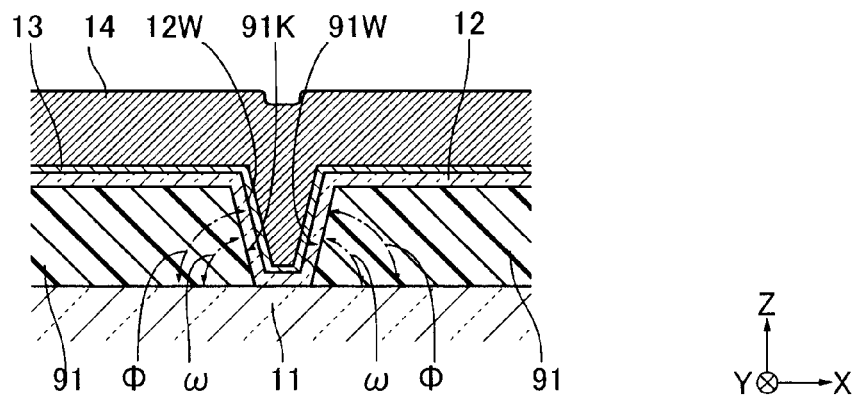
FIG. 14 is a view showing a step after the step shown in FIG. 13.

Next, the plated film 14 is grown on the electrode film 13 in such a manner as to fill the opening 91K by performing electroplating with the electrode film 13 as a seed film, as shown in FIG. 14. As has been described hereinabove, the plated film 14 is formed to have a saturation magnetic flux density equal to or greater than 2.3 T. Its preferred material and composition are as described above. For confirmation, the plated film 14 contains at least Fe and Co among Fe, Co and Ni and preferably has a composition in the range of 40 at. %≦Fe≦80 at. %, 20 at. %≦Co≦60 at. %, and 0 at. %≦Ni≦5 at. %.

Figure 15:
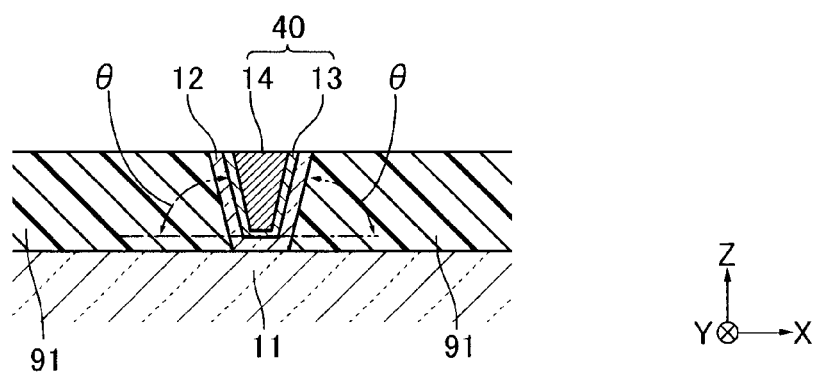
FIG. 15 is a view showing a step after the step shown in FIG. 14.

Then, the second non-magnetic film 12, the electrode film 13 and the plated film 14 are selectively removed until at least the resist pattern 91 is exposed, thereby forming the main magnetic pole film 40 as a magnetic film pattern to fill the opening 91K where the second non-magnetic film 12 is formed, as shown in FIG. 15. Upon removing the second non-magnetic film 12, the electrode film 13 and the plated film 14, for example, a polishing method such as CMP or an etching method such as ion milling or reactive ion etching (RIE) may be adopted. Upon formation of the main magnetic pole film 40, the bevel angle θ is set equal to the inclination Φ of the second non-magnetic film 12, and in other words, the bevel angle θ is set equal to the inclination ω of the resist pattern 91.

Figure 16:
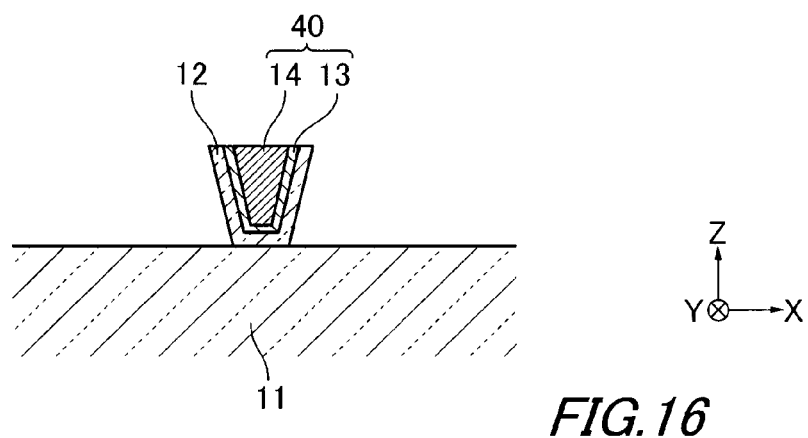
FIG. 16 is a view showing a step after the step shown in FIG. 15.
Figure 17:
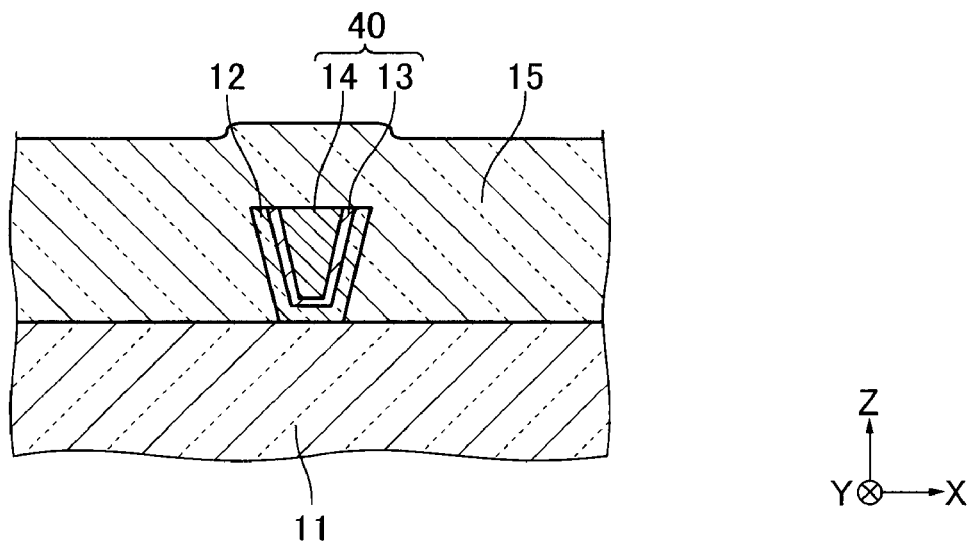
FIG. 17 is a view showing a step after the step shown in FIG. 16.
Figure 18:
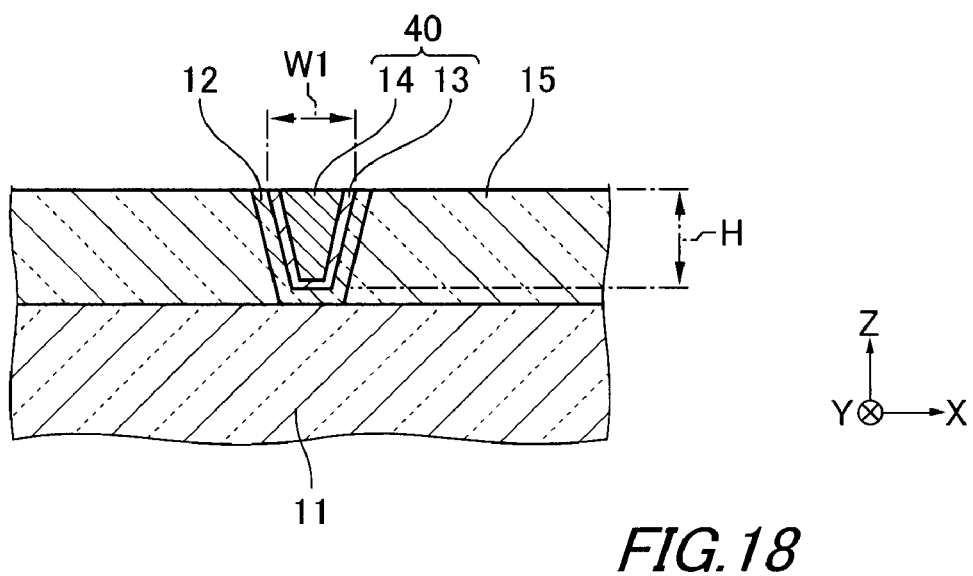
FIG. 18 is a view showing a step after the step shown in FIG. 17.

Then, after the remaining resist pattern 91 is removed by using washing with an organic solvent or ashing, as shown in FIG. 16, the first non-magnetic film 15 is formed, for example, by using sputtering to cover the second non-magnetic film 12 and the main magnetic pole film 40, as shown in FIG. 17. Subsequently, the first non-magnetic film 15 is selectively removed (polished) until at least the second non-magnetic film 12 and the main magnetic pole film 40 are exposed, for example, by using CMP, thereby flattening the second non-magnetic film 12, the main magnetic pole film 40 and the first non-magnetic film 15, as shown in FIG. 18. In the polishing process, the polishing amount should be adjusted, for example, to set the width W1 and the height H of the main magnetic pole film 40 to desired values.

Finally, the air bearing surface 70 is formed at the next step, thereby forming the end face 40M of the main magnetic pole film 40 and the end face 60M of the magnetic film 60. Upon formation of the air bearing surface 70, the difference in hardness between the main magnetic pole film 40 and the first and first non-magnetic films 15, 12 is utilized, for example, by adjusting processing conditions such as polishing conditions, so that the second non-magnetic film 12 recedes from the first non-magnetic film 15 and the main magnetic pole film 40 projects from the second non-magnetic film 12 to have the end face 40M flush with the air bearing surface 70.

In the foregoing embodiment, the second non-magnetic film 12 is formed by ALD. The use of ALD itself is not the direct subject of the present invention, but its advantages will be described with reference to FIG. 12 showing its application process and FIGS. 1 to 7 and so on.

In case where both the first and second non-magnetic films 12, 15 are formed by sputtering or the like, since there is no difference in hardness therebetween, the second non-magnetic film 12 does not recede from the first non-magnetic film 15 through the processing of the air bearing surface 70. In this case, since the front end portion 40A is entirely enclosed by the second non-magnetic film 12 to maximize the contact area of the second non-magnetic film 12 with the front end portion 40A, the effect of residual stress on the second non-magnetic film 12 applied to the front end portion 40A increases extremely, tending to cause fixing of the magnetic domain structure of the front end portion 40A (or domain lock). Thus, the magnetic domain structure of the front end portion 40A is changed from its original state at the time of formation of the main magnetic pole film 40. If the magnetic domain structure of the front end portion 40A is fixed, the residual magnetic flux of the main magnetic pole film 40 tends to leak through the front end portion 40A when recording is not performed, increasing the probability of pole erase.

If there is adopted a process in which the second non-magnetic film 12 is formed by ALD and the first non-magnetic film 15 is formed by sputtering or the like, on the other hand, since there is some difference in hardness therebetween, the difference in hardness therebetween can be utilized upon processing the air bearing surface 70 to adopt a processing method letting the second non-magnetic film 12 recede from the first non-magnetic film 15.

In the foregoing magnetic head manufacturing method, furthermore, the main magnetic pole film 40 (the front end portion 40A) is formed in the opening 91K by: (1) forming the resist pattern 91 with the opening 91K; (2) forming the second non-magnetic film 12 to narrow the opening 91K; (3) depositing the electrode film 13 and the plated film 14 to fill the opening 91K where the second non-magnetic film 12 is formed; and (4) selectively removing the second non-magnetic film 12, the electrode film 13 and the plated film 14 until the resist pattern 91 is exposed. In this case, if the second non-magnetic film 12 is formed by using a dry film formation method, which is excellent in controlling the film thickness, so as to narrow the opening 91K, the final opening width (or width over which the front end portion 40A is to be formed) becomes less variable as compared with a conventional case of using an insoluble film whose film thickness is difficult to control. Thus, the trailing edge width W1 can be decreased to a width that cannot be realized with photolithography (approximately 0.2 μm or less) while achieving accuracy similar to that with photolithography.

Furthermore, since only the step of forming the second non-magnetic film 12 is required as a film forming step to form the main magnetic pole film 40, the number of processing steps can be reduced as compared with a conventional case where a strippable film forming step is required in addition to an additional film forming step. This simplifies the formation process of the main magnetic pole film 40. Thus, the production process of the magnetic head can be performed with high accuracy and simplified.

In cases of using a method other than ALD, when the second non-magnetic film 12 is formed to cover the inner wall 91W of the resist pattern 91, the thickness of the second non-magnetic film 12 may vary along the inner wall 91W depending on the depth or inclination ω of the opening 91K, causing the possibility that the inclination Φ will differ from the inclination ω. This thickness variation may be, for example, such that the thickness of the second non-magnetic film 12 increases with distance from the non-magnetic film 11. In this case, since the bevel angle θ differs from the inclination ω, the trailing edge width W1 and the bevel angle θ differ from their desired values. The accuracy of determining the trailing edge width W1 and the bevel angle θ in this case is higher than in conventional cases but may be insufficient to meet a manufacturing specification that requires strict accuracy.

In the case of using ALD, on the other hand, since the thickness of the second non-magnetic film 12 is uniform along the inner wall 91, as shown in FIG. 11, the inclination Φ is equal to the inclination ω. In this case, since the bevel angle θ is equal to the inclination ω, as shown in FIG. 15, the trailing edge width W1 and the bevel angle θ coincide with their desired values. Thus, since the accuracy of determining the trailing edge width W1 and the bevel angle θ can be sufficiently increased by controlling the bevel angle θ based on the inclination ω, the main magnetic pole film 40 can be formed with higher accuracy.

Particularly, the resist pattern 91 can be made less prone to deformation in the formation process of the second non-magnetic film 12 by setting the film formation temperature by ALD lower than the glass transition temperature of the resist pattern 91. In this case, deformation of the resist pattern due to foaming or variation of the inclination c from its original value at the time of formation due to flowing can be prevented. Accordingly, also from this viewpoint, the main magnetic pole film 40 can be formed with high accuracy.

It should be noted that although in the present embodiment, the determination of the width W1 and the height H of the main magnetic pole film 40 is carried out by using a polishing process at the time of polishing the first non-magnetic film 15, but is not necessarily limited thereto. For example, as shown in FIGS. 17 and 18, the width W1 and the height H may be determined by using a polishing process at the time of forming the plated film 14 or the like. Also in this case, the same effects can be obtained.

Figure 19:
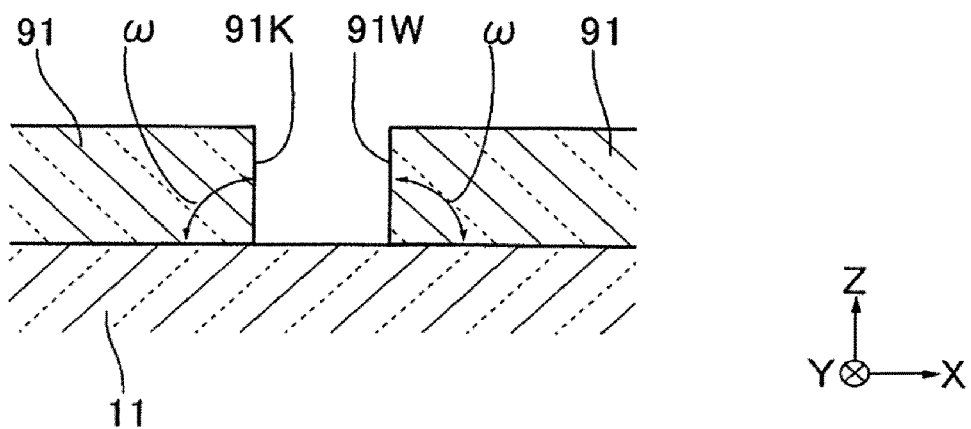
FIG. 19 is a view showing an another step for manufacturing the magnetic head.
Figure 20:
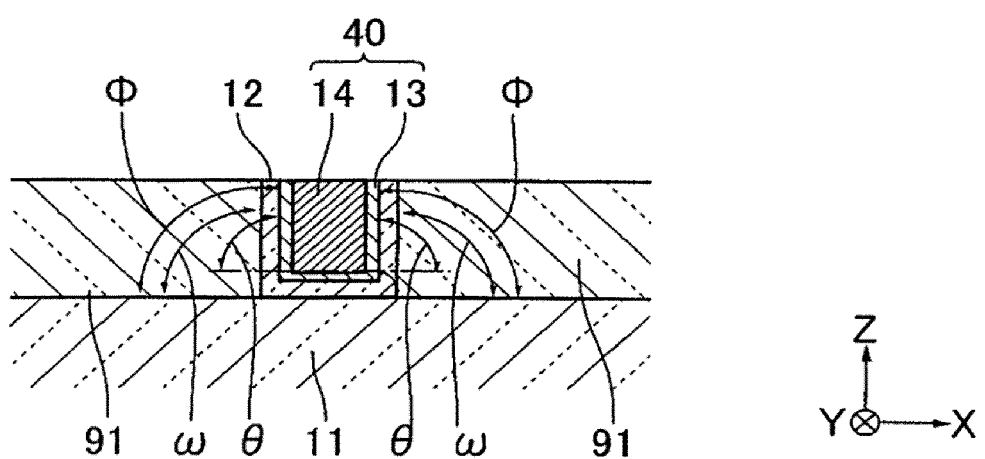
FIG. 20 is a view showing a step after the step shown in FIG. 19.

Although in the foregoing embodiments, the main magnetic pole film 40 is formed to have an inverted trapezoid cross-section by forming the resist pattern 91 with the inner wall 91W inclined with respect to the surface of the non-magnetic film 11 (the inclination ω<90 degrees), but is not necessarily limited thereto. For example, as shown in FIGS. 19 and 20, the main magnetic pole film 40 may be formed to have a rectangular cross-section by forming the resist pattern 91 with the inner wall 91W normal to the surface of the non-magnetic film 11 (the inclination ω=90 degrees). Also in this case, the same effects can be obtained.

3. Head Assembly

The present invention further discloses a head assembly. The head assembly includes the foregoing magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

Figure 21:
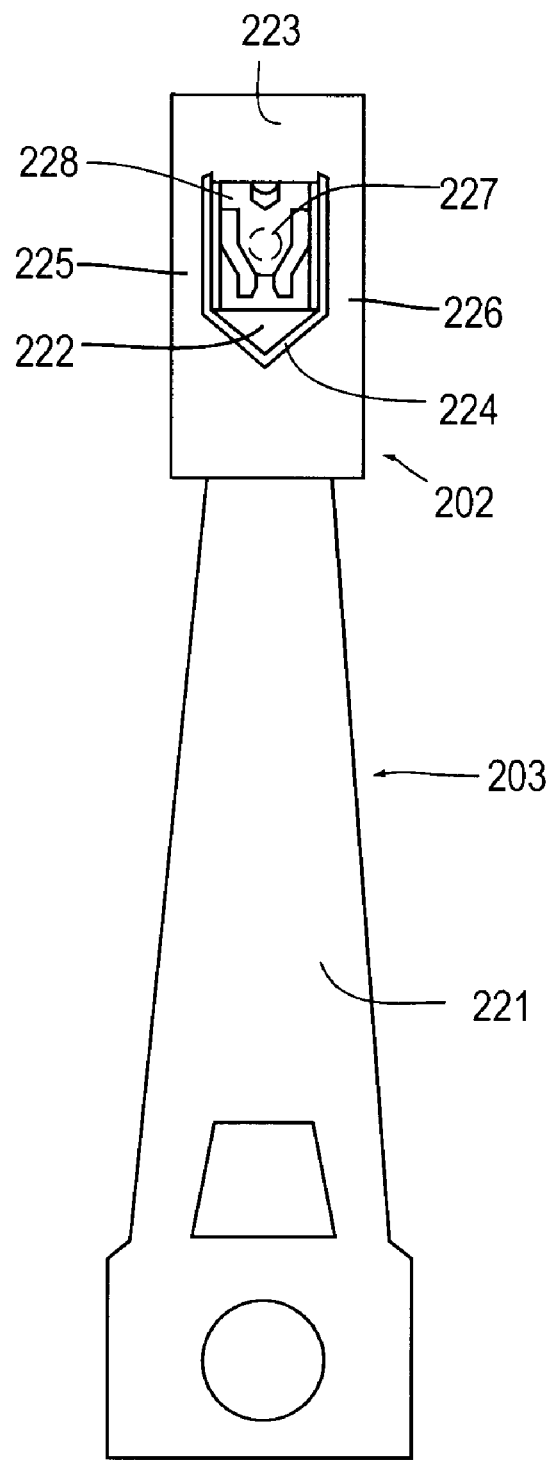
FIG. 21 is a plan view of an HGA according to the present invention.
Figure 22:
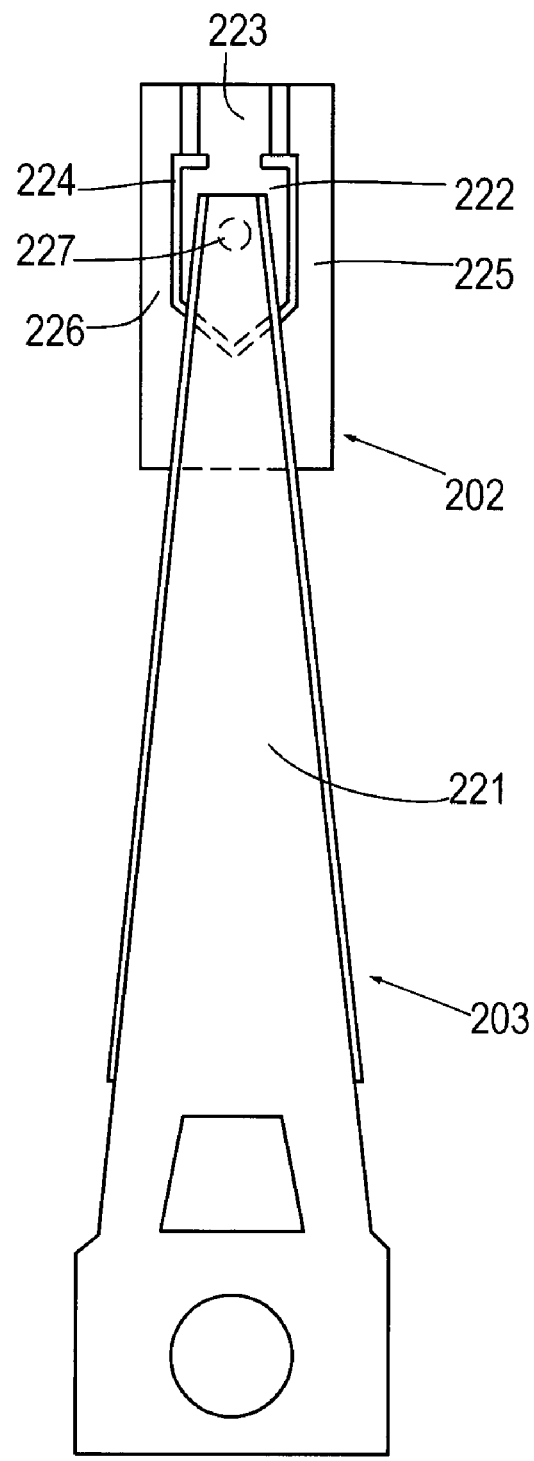
FIG. 22 is a bottom view of the HGA shown in FIG. 21.

FIG. 21 is a front view of a head assembly according to the present invention, and FIG. 22 is a bottom view of the head assembly shown in FIG. 21. The illustrated head assembly is an HGA including a suspension 203 and a magnetic head 228. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head 228 is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The magnetic head 228 is attached to one side of the tongue portion 222 through an adhesive or the like to be in spring contact with the tip of the load dimple 227.

One face of the magnetic head 228 opposite to the air bearing surface of the slider is attached to the tongue portion 222 of the suspension 203. Flexible leads and the like not shown in the drawings are connected to the magnetic head 228.

Figure 23:
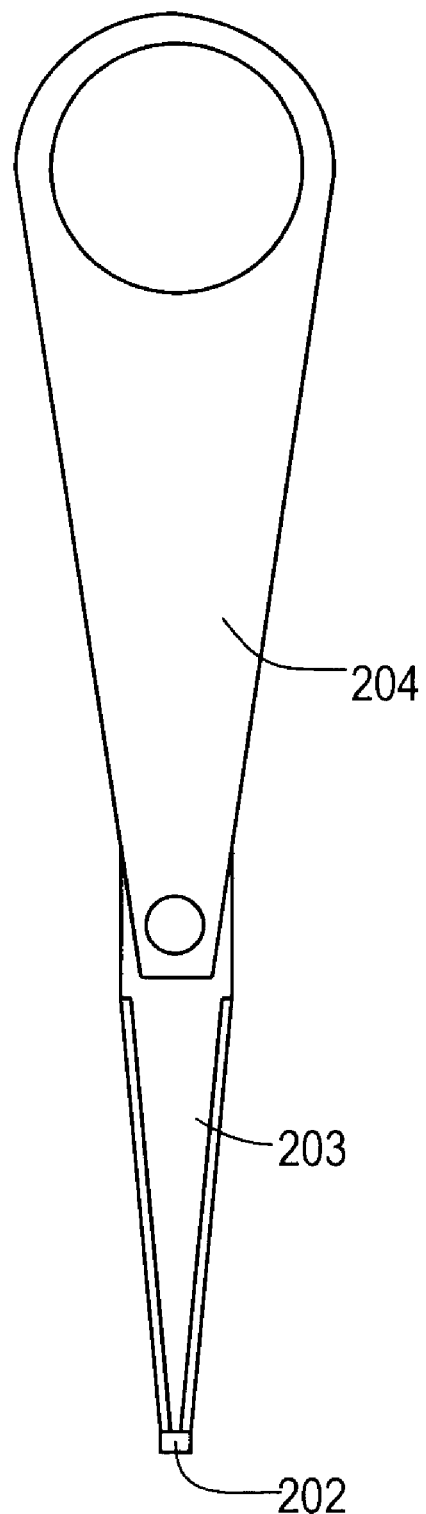
FIG. 23 is a plan view of an HAA according to the present invention.

FIG. 23 is a front view of an HAA. The illustrated HAA includes the suspension 203, the magnetic head 228 and an arm 204. The arm 204 is integrally formed of a suitable non-magnetic metallic material such as an aluminium alloy. The arm 204 is provided with a mounting hole. The mounting hole is used for mounting on a positioning device provided in a magnetic disk apparatus. One end of the suspension 203 is secured to the arm 204, for example, with a ball connecting structure.

4. Magnetic Recording/Reproducing Apparatus

Figure 24:
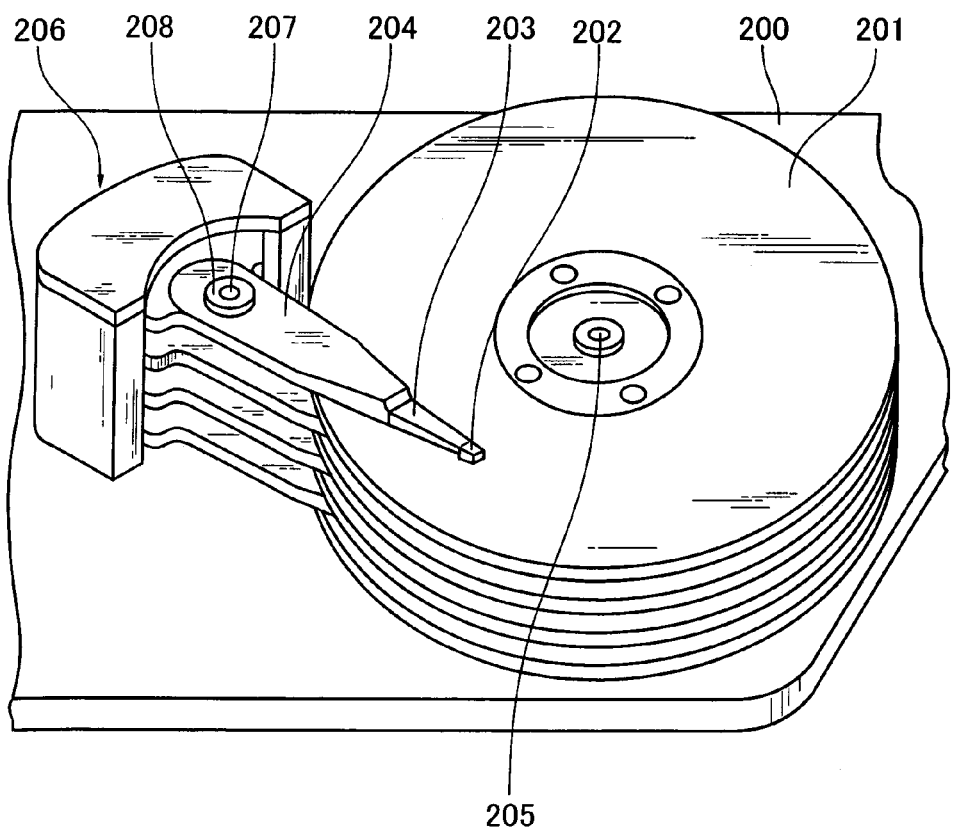
FIG. 24 is a perspective view of a magnetic recording apparatus according to the present invention.

Next will be described a structure of a magnetic recording apparatus mounted with the magnetic head according to the present invention. FIG. 24 shows the structure of the magnetic recording apparatus. The magnetic recording apparatus, which is mounted with the foregoing magnetic head, is, for example, a hard disk drive.

As shown in FIG. 24, for example, the magnetic recording apparatus includes, within a case 200, a plurality of magnetic disks (e.g., hard disks) 201 corresponding to the recording medium 80 for magnetically recording information, a plurality of suspensions 203 disposed corresponding to the respective magnetic disks 201 and supporting the magnetic heads at their one ends, and a plurality of arms 204 supporting the other ends of the suspensions 203. The magnetic disks 201 are rotatable about a spindle motor 205 which is fixed to the case 200. The arms 204 are connected to an actuator 206 which functions as a power source and are pivotable through a bearing 208 about a fixed shaft 207 which is fixed to the case 200.

The actuator 206 is constructed to include, for example, a driving source such as a voice coil motor. For example, the magnetic recording apparatus is a model where the plurality of arms 204 are pivotable about the fixed shaft 207 in an integrated manner. In FIG. 26, the case 200 is shown partially cut-out to make it easy to see the internal structure of the magnetic recording apparatus.

The magnetic head 228 is a magnetic head according to the present invention. When the magnetic disk 201 rotates for recording or reproducing information, an air flow generated between the recording surface (or magnetic head-facing surface) of the magnetic disk 201 and the air bearing surface 220 is utilized to let the magnetic head take off from the recording surface of the magnetic disk 201.

As shown in FIG. 26, the recording medium 80 includes, for example, a magnetization film 81 and a soft magnetic film 82 disposed close to and remote from the magnetic head, respectively. The magnetization film 81 functions to magnetically record information, while the soft magnetic film 82 functions as a path of a magnetic flux (so-called flux path) in the recording medium 80. The recording medium 80 of this type is generally called "double layer recording medium" for perpendicular recording. Needless-to-say, the recording medium 80 may include another layer, for example, in addition to the above magnetization film 81 and soft magnetic film 82.

The upwardly directed arrow shown in FIG. 26 indicates the moving direction M along which the recording medium 80 relatively moves with respect to the magnetic head. Assuming that the movement of the recording medium 80 moving in the moving direction M is a kind of flow, the foregoing "trailing side" refers to a flow-out side (or front side in the moving direction M), and particularly in this case, refers to an upper side in the thickness direction (Z-axis direction). On the other hand, a flow-in side (or rear side in the moving direction M) is referred to as "leading side", and particularly in this case, corresponds to a lower side in the thickness direction. The upper end edge E1, which is a recording portion of the main magnetic pole film 40, is called "trailing edge TE", and its width W1 is called "trailing edge width".

Figure 25:
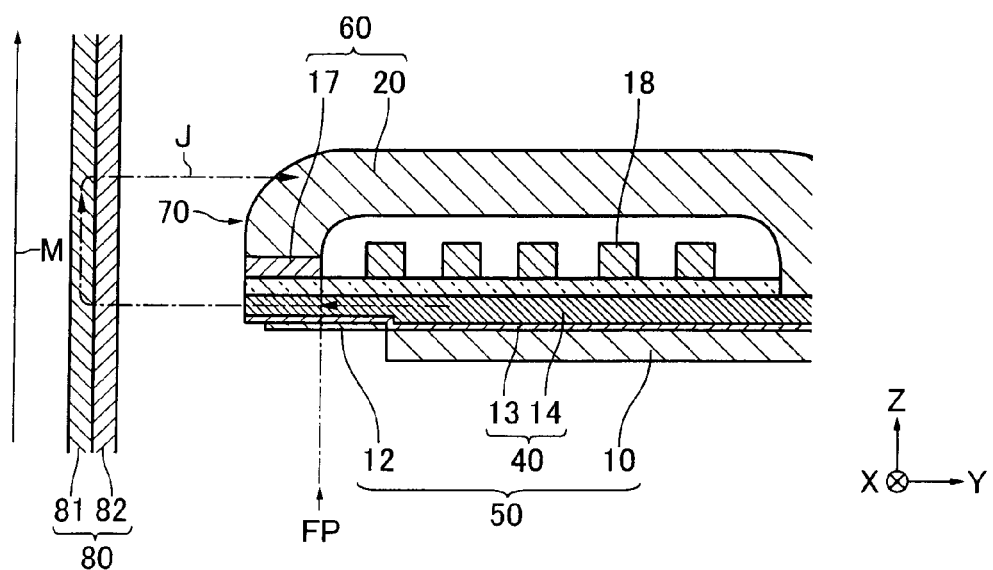
FIG. 25 is a view illustrating recording operation of the magnetic recording/reproducing apparatus shown in FIG. 24.

Recording and reproducing operations to be performed by the above magnetic recording/reproducing apparatus will be described with reference to FIG. 25. When recording information, specifically, a recording magnetic flux J is generated as a current flows from an external circuit not shown in the drawings to the coil film 18 of the recording head portion 100B. After absorbed in the auxiliary magnetic pole film 10 and the main magnetic pole film 40 of the magnetic pole film 50, the magnetic flux J flows toward the front end portion 40A. At this time, since the magnetic flux J is focused because of narrowing at the flare point FP, it is finally concentrated in the vicinity of the trailing edge TE. When the magnetic flux J concentrated in the vicinity of the trailing edge TE is emitted to generate a perpendicular magnetic field, the magnetization film 81 is magnetized by the perpendicular magnetic field, thereby magnetically recording information on the recording medium 80.

In this case, the gradient of the perpendicular magnetic field increases because the spreading component of the magnetic flux J is absorbed in the write shield film 17. The magnetic flux J absorbed in the write shield film 17 is resupplied to the magnetic pole film 50 through the return yoke film 20.

After magnetization of the magnetization film 81, the magnetic flux J emitted from the magnetic pole film 50 toward the recording medium 80 is absorbed in the return yoke film 20 through the soft magnetic film 82. At this time, a part of the magnetic flux J is also absorbed in the write shield film 17. The magnetic flux J absorbed in the write shield film 17 and the return yoke film 20 is also resupplied to the magnetic pole film 50. This enables circulation of the magnetic flux J between the recording head portion 100B and the recording medium 80.

In the magnetic head according to the present invention, moreover, since the crystal grain size is small even at the trailing edge TE important for writing, it can contribute to resolving the problem of increase in the coercive force due to increase in the crystal grain size.

When reproducing information, on the other hand, as a sense current flows through the MR element 8 of the reproducing head portion 10A, the resistance value of the MR element 8 changes depending on the reproducing signal magnetic field from the recording medium 80. Information recorded on the recording medium 80 can be magnetically reproduced by detecting the resistance change as a voltage change.

Since the magnetic recording apparatus is mounted with the foregoing magnetic head, the operating characteristics of the magnetic recording apparatus can be stabilized and the production process can be performed with high accuracy and simplified.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising a slider and a perpendicular recording element,
   wherein said perpendicular recording element includes a main magnetic pole film for emitting a perpendicular magnetic field and is supported by said slider,
   said main magnetic pole film includes an electrode film and a plated film,
   said electrode film is a single seed film layer for plating and is disposed on a non-magnetic film which is made of an insulating material,
   said plated film is a single magnetic film layer grown on said electrode film,
   said electrode film is a PdNi alloy containing Pd in the range of 95 to 80 at. % and Ni in the range of 5 to 20 at. %,
   a trailing edge of said plated film is adjacent to a gap film between said main magnetic pole film and a write shield film, and
   said electrode film is disposed along a bottom face and both side faces of said plated film.

2. The magnetic head of claim 1, wherein said plated film has a saturation magnetic flux density of 2.3 T.

3. The magnetic head of claim 2, wherein said plated film contains at least Fe and Co among Fe, Co and Ni.

4. The magnetic head of claim 3, wherein said plated film has a composition in the range of 40 at. %≦Fe≦80 at. %, 20 at. %≦Co≦60 at. %, and 0 at. %≦Ni≦5 at. %.

5. The magnetic head of claim 4, wherein said plated film contains 62 at. % Fe, 35 at. % Co, and 3 at. % Ni.

6. The magnetic head of claim 1, which includes a second non-magnetic film formed by ALD (atomic layer deposition), wherein said electrode film is adhered onto said second non-magnetic film.

7. The magnetic head of claim 6, wherein an adhesive film is disposed between said electrode film and said second non-magnetic film so as to enhance an adhesion strength of said electrode film to said second non-magnetic film.

8. The magnetic head of claim 1, which further includes a reproducing element.

9. A head assembly comprising a magnetic head and a head support device,
   wherein said magnetic head includes a slider and a perpendicular recording element,
   said perpendicular recording element includes a main magnetic pole film for emitting a perpendicular magnetic field and is supported by said slider,
   said main magnetic pole film includes an electrode film and a plated film,
   said electrode film is a seed film for plating and is formed disposed on a non-magnetic film which is made of a non-magnetic insulating material,
   said plated film is a magnetic film grown on said electrode film, said head support device supports said magnetic head in such a manner as to permit rolling and pitching of said magnetic head, said electrode film of said magnetic head is a PdNi alloy containing Pd in the range of 95 to 80 at. % and Ni in the range of 5 to 20 at. %, a trailing edge of said plated film is adjacent to a gap film between said main magnetic pole film and a write shield film; and said electrode film is disposed along a bottom face and both side faces of said plated film.

10. The head assembly of claim 9, wherein said plated film of said magnetic head has a saturation magnetic flux density of 2.3 T.

11. The head assembly of claim 10, wherein said plated film of said magnetic head contains at least Fe and Co among Fe, Co and Ni.

12. The head assembly of claim 11, wherein said plated film of said magnetic head has a composition in the range of 40 at. %≦Fe≦80 at. %, 20 at. %≦Co≦60 at. %, and 0 at. %≦Ni≦5 at. %.

13. The head assembly of claim 12, wherein said plated film of said magnetic head contains 62 at. % Fe, 35 at. % Co, and 3 at. % Ni.

14. The head assembly of claim 9, wherein said magnetic head includes a second non-magnetic film formed by ALD (atomic layer deposition) and said electrode film is adhered onto said second non-magnetic film.

15. The head assembly of claim 14, wherein said magnetic head has an adhesive film between said electrode film and said second non-magnetic film so as to enhance an adhesion strength of said electrode film to said second non-magnetic film.

16. The head assembly of claim 9, wherein said magnetic head further includes a reproducing element.

17. A magnetic recording/reproducing apparatus comprising a head assembly and a magnetic recording medium,
wherein said head assembly includes a magnetic head and a head support device,
said magnetic head includes a slider and a perpendicular recording element,
said perpendicular recording element includes a main magnetic pole film for emitting a perpendicular magnetic field and is supported by said slider,
said main magnetic pole film includes an electrode film and a plated film,
said electrode film is a seed film for plating and is disposed on a non-magnetic film which is made of a non-magnetic insulating material,
said plated film is a magnetic film grown on said electrode film,
said head support device supports said magnetic head in such a manner as to permit rolling and pitching of said magnetic head,
said head assembly cooperates with said magnetic recording medium to record magnetic data on said magnetic recording medium,
said electrode film of said magnetic head is a PdNi alloy containing Pd in the range of 95 to 80 at. % and Ni in the range of 5 to 20 at. %,
a trailing edge of said plated film is adjacent to a gap film between said main magnetic pole film and a write shield film, and
said electrode film is disposed along a bottom face and both side faces of said plated film.

18. The magnetic recording/reproducing apparatus of claim 17, wherein said plated film of said magnetic head has a saturation magnetic flux density of 2.3 T.

19. The magnetic recording/reproducing apparatus of claim 18, wherein said plated film of said magnetic head contains at least Fe and Co among Fe, Co and Ni.

20. The magnetic recording/reproducing apparatus of claim 19, wherein said plated film of said magnetic head has a composition in the range of 40 at. %≦Fe≦80 at. %, 20 at. %≦Co≦60 at. %, and 0 at. %≦Ni≦5 at. %.

21. The magnetic recording/reproducing apparatus of claim 20, wherein said plated film of said magnetic head contains 62 at. % Fe, 35 at. % Co, and 3 at. % Ni.

22. The magnetic recording/reproducing apparatus of claim 17, wherein said magnetic head includes a second non-magnetic film formed by ALD (atomic layer deposition) and said electrode film is adhered onto said second non-magnetic film.

23. The magnetic recording/reproducing apparatus of claim 22, wherein said magnetic head has an adhesive film between said electrode film and said second non-magnetic film so as to enhance an adhesion strength of said electrode film to said second non-magnetic film.

24. The magnetic recording/reproducing apparatus of claim 17, wherein said magnetic head further includes a reproducing element.

25. A magnetic head comprising a slider and a perpendicular recording element,
wherein said perpendicular recording element includes a main magnetic pole film for emitting a perpendicular magnetic field and is supported by said slider,
said main magnetic pole film includes an electrode film and a plated film,
said electrode film is a single seed film layer for plating and is disposed on a non-magnetic film which is made of an insulating material,
said plated film is a single magnetic film layer grown on said electrode film,
said electrode film is a PdNi alloy containing Pd in the range of 95 to 80 at. % and Ni in the range of 5 to 20 at. %,
an end face of the main magnetic pole film on a side close to an air bearing surface is of an inverted trapezoid shape,
trailing edges of said plated film, said electrode film and said non-magnetic film are adjacent to a gap film between said main magnetic pole film and a write shield film, and
said electrode film is disposed along a bottom face and both side faces of said plated film.

26. A magnetic recording/reproducing apparatus comprising a head assembly and a magnetic recording medium,
wherein said head assembly includes a magnetic head and a head support device,
said magnetic head includes a slider and a perpendicular recording element,
said perpendicular recording element includes a main magnetic pole film for emitting a perpendicular magnetic field and is supported by said slider,
said main magnetic pole film includes an electrode film and a plated film,
said electrode film is a seed film for plating and is disposed on a non-magnetic film which is made of a non-magnetic insulating material, said plated film is a magnetic film grown on said electrode film, said head support device supports said magnetic head in such a manner as to permit rolling and pitching of said magnetic head, said head assembly cooperates with said magnetic recording medium to record magnetic data on said magnetic recording medium, said electrode film of said magnetic head is a PdNi alloy containing Pd in the range of 95 to 80 at. % and Ni in the range of 5 to 20 at. %, an end face of the main magnetic pole film on a side close to an air bearing surface is of an inverted trapezoid shape, trailing edges of said plated film, said electrode film and said non-magnetic film are adjacent to a gap film between said main magnetic pole film and a write shield film, and said electrode film is disposed along a bottom face and both side faces of said plated film.

* * * * *